US005824462A

United States Patent [19]

Ashida et al.

[11] Patent Number: 5,824,462

[45] Date of Patent: Oct. 20, 1998

[54] RESIN-COATED PAPER

[75] Inventors: Tetsuya Ashida; Touru Noda; Osamu Kojima; Tomoichi Morita, all of Tokyo; Nobushige Ikeya; Takuya Seri, both of Kurashiki; Kohhei Nitta, Ishikawa, all of Japan

[73] Assignees: Mitsubishi Paper Mills Limited; Mitsubishi Chemical Corporation, both of Tokyo, Japan

[21] Appl. No.: 713,370

[22] Filed: Sep. 13, 1996

Related U.S. Application Data

[63] Continuation of Ser. No. 367,252, filed as PCT/JP94/00788, May 16, 1994, abandoned.

[30] Foreign Application Priority Data

| | | | |
|---|---|---|---|
| May 17, 1993 | [JP] | Japan | 5-114849 |
| Dec. 15, 1993 | [JP] | Japan | 5-315532 |

[51] Int. Cl.[6] ..... G03C 1/76; G03C 1/775; B32B 7/02; B32B 27/08

[52] U.S. Cl. ..... 430/531; 430/523; 430/536; 430/538; 430/930; 430/935; 428/213; 428/218; 428/511; 428/513; 428/516

[58] Field of Search ..... 430/523, 531, 430/536, 538, 930, 935; 428/213, 218, 511, 513, 516

[56] References Cited

U.S. PATENT DOCUMENTS

| | | | |
|---|---|---|---|
| 3,247,290 | 4/1966 | Werkman et al. | 525/197 |
| 4,331,508 | 5/1982 | Miyama et al. | 430/538 |
| 4,699,874 | 10/1987 | Kitagawa et al. | 430/538 |
| 4,895,688 | 1/1990 | Shigetani et al. | 430/538 |
| 5,104,722 | 4/1992 | Kojima et al. | 428/218 |
| 5,135,827 | 8/1992 | Bohm et al. | 430/935 |
| 5,178,936 | 1/1993 | Kamiya et al. | 430/538 |
| 5,182,161 | 1/1993 | Noda et al. | 430/538 |
| 5,326,624 | 7/1994 | Tsubaki et al. | 428/213 |
| 5,360,701 | 11/1994 | Elton et al. | 430/533 |
| 5,372,884 | 12/1994 | Abe et al. | 428/331 |

FOREIGN PATENT DOCUMENTS

| | | |
|---|---|---|
| 58-95732 | 6/1983 | Japan . |
| 60-150049 | 8/1985 | Japan . |
| 62-235945 | 10/1987 | Japan . |
| 2-58042 | 2/1990 | Japan . |
| 2-58043 | 2/1990 | Japan . |
| 3-42655 | 2/1991 | Japan . |
| 3-65948 | 3/1991 | Japan . |
| 3-111842 | 5/1991 | Japan . |
| 4-172340 | 6/1992 | Japan . |
| 5-100357 | 4/1993 | Japan . |

*Primary Examiner*—Glenn Caldarola
*Assistant Examiner*—J. Pasterczyk
*Attorney, Agent, or Firm*—Cushman Darby and Cushman IP Group of Pillsbury Madison & Sutro LLP

[57] ABSTRACT

Disclosed are resin-coated paper having on one side of its base paper a first resin layer made of a resin composition obtained by melt-blending 90 to 65 parts by weight of a high-density polyethylene resin having a melt flow rate of 10.0 g/10 min to 40.0 g/10 min and a density of 0.960 g/$cm^3$ or more and 10 to 35 parts by weight of a low-density polyethylene resin or a medium-density polyethylene resin, which has a melt flow rate of 0.2 g/10 min to 2 g/10 min, a density of 0.935 g/$cm^3$ or less, a percentage of molecules with a molecular weight of 500,000 or more of 10% by weight or more and a critical shear rate of 0.5 (l/sec) or less, said resin composition obtained by the melt-blending having a critical shear rate of 10 (l/sec) or less; and a process for producing the resin-coated paper. The resin-coated paper is good in the molding processability of the resin layer, is excellent in the adhesion between the resin layer and the base paper, and contains only a small amount of a gel formed.

19 Claims, 1 Drawing Sheet

RESIN-COATED PAPER

This a continuation of application Ser. No. 08/367,252, filed as PCT/JP94/00788, May 16, 1994, which was abandoned upon the filing hereof.

[TECHNICAL FIELD]

The present invention relates to resin-coated paper comprising paper as a substrate, a resin layer coating one side of the paper substrate (hereinafter referred to as "base paper") on which an image-forming layer is to be formed, and optionally a resin layer coating the other side of the base paper, the former resin layer being made of a resin composition composed mainly of a polyolefin resin, and the latter resin layer being made of a resin composition composed mainly of polyethylene type resins, which resin-coated paper is suitably used as a support for image-forming material. Particularly, the present invention relates to a resin-coated paper type support for image-forming material which is free from problems caused by the transfer of stains on a cooling roll, does not contain a gelatinous foreign matter formed in the resin layer on the side reverse to the side on which the image-forming layer is to be formed, are satisfactory in performance characteristics such as curling properties, cuttability, and adhesion between the base paper and this resin layer, and can be produced rapidly and stably.

[BACKGROUND ART]

There are well known resin-coated papers obtained by coating at least one side of base paper with a resin having film-forming properties which are for supports for image-forming material. For example, Japanese Patent Post-examined Publication No. 55-12584 discloses a technique relating to a photographic support obtained by coating base paper with a resin having film-forming properties, preferably a polyolefin resin. U.S. Pat. No. 3,501,298 discloses a technique relating to a photographic support obtained by coating both sides of base paper with a polyolefin resin. Since the application of a rapid photographic development processing method for a silver halide photosensitive material, photographic supports obtained by coating both sides of base paper with a polyethylene type resin have been mainly put to practical use, and the resin layer on one side of the base paper, i.e., the image-forming side usually contains a titanium dioxide pigment for impartment of definition if necessary.

In addition, U.S. Pat. No. 4,774,224 has proposed an image-receiving element for thermal transfer recording which has, as a support, resin-coated paper having a surface roughness of resin coating of 7.5 microinches-AA or less, in particular, a polyethylene-resin-coated paper obtained by coating the surface of base paper with a polyethylene resin. Japanese Patent Unexamined Publication No. 63-307979 discloses a technique relating to a sheet for ink jet printing which has resin-coated paper as a support.

Furthermore, there have been proposed techniques relating to photographic supports obtained by coating base paper on its side reverse to the side on which a photographic layer is to be formed, with a resin composition containing a low-density polyethylene resin and a high-density polyethylene resin. For example, Japanese Patent Post-examined Publication No. 44-22904 discloses a photographic support obtained by coating base paper with a polyethylene composition which comprises 15 to 65% by weight of a specific low-density polyethylene resin having a density of 0.915–0.926 g/cm$^3$ and a melt index of 2.9–16 g/10 min and 85 to 35% by weight of a specific high-density polyethylene resin having a density of 0.960–0.975 g/cm$^3$ and a melt index of 5–18 g/10 min and has a rapid-coating ability and does not cause neck-in and pinholes. Japanese Patent Post-examined Publication No. 48-9963 discloses a photographic support obtained by coating base paper with a resin composition comprising a low-density polyethylene resin and a high-density polyethylene resin in the ratio of 1:1, which is satisfactory in curling properties. In addition, Japanese Patent Unexamined Publication No. 58-95732 discloses a photographic support obtained by coating base paper with a polyethylene resin composition comprising 40 to 75 parts by weight of a high-density polyethylene resin having a density of 0.945 g/cm$^3$ or more and a melt index of 15–40 g/10 min and 60 to 25 parts by weight of a low-density polyethylene resin having a density of 0.930 g/cm$^3$ or less and a melt index of 1–40 g/10 min, which is satisfactory in cuttability and curling properties.

However, it was found that even when there is used any of these resin compositions comprising a low-density polyethylene resin and a high-density polyethylene resin which have been disclosed in the prior art, a serious problem is caused in the production of a resin-coated paper type support for image-forming material which contains paper as a substrate. The resin-coated paper type support for image-forming material has still been seriously disadvantageous in quality.

In detail, first, paper coated with a polyethylene type resin is produced usually by a series of steps of extruding a molten polyethylene type resin composition into a film on running base paper through the slit die of a melt extruder, casting the film on the base paper to coat the base paper therewith, pressure-bonding the same to the base paper between a pressing roll and a cooling roll, and peeling the resulting assembly from the rolls after cooling. However, when there is used a heretofore well-known resin composition comprising a low-density polyethylene resin and a high-density polyethylene resin, the cooling roll tends to have stains composed mainly of the polyethylene resin composition or a modified product thereof which are called "cooling roll stains". The production of polyethylene-resin-coated paper is carried out by operating the melt extruder continuously for at least 2 to 3 days, usually a week, sometimes a month, from the start of the operation. There has been the following tendency: the longer the continuous operation time becomes, the more the cooling roll stains are disadvantageously accumulated.

There has been the following problem. If a large number of stains begin to appear during the production of polyethylene-resin-coated paper, the peelability of the polyethylene-resin-coated paper from the cooling roll are deteriorated, namely, the adhesion between the cooling roll and the resin layer is increased, resulting in a stronger tendency of the resin layer to attachment to the cooling roll. Therefore, the adhesion between the base paper and the resin layer is nonuniformly decreased, and in the worst case, the base paper and the resin layer peel from each other. Thus, the polyethylene-resin-coated paper becomes utterly unsuitable and unmarketable as resin-coated paper for a support for image-forming material. There has also been the following problem. The polyethylene-resin-coated paper is wound up, with the accumulated cooling roll stains adhering to the resin layer, and the stains are transferred to appear on the resin layer surface on the side on which an image-forming layer is to be formed. Therefore, there is caused deterioration in quality which is fatal to the employment of the resin-coated paper as a support for image-forming material. Moreover, in some cases, the problem of the transfer of the cooling roll stains causes the following serious problem: the stains are once transferred to the roll of a laminator for producing the resin-coated paper or the roll of an emulsion coater and then re-transferred to deteriorate the quality. Therefore, it has been necessary to take a sufficient measure to prevent the cooling roll stains.

Secondly, when there is used a heretofore well-known resin composition comprising a low-density polyethylene resin and a high-density polyethylene resin, a gelatinous foreign matter tends to be formed on the surface of the coating resin. There has been the following tendency: the longer the continuous operation becomes, the more the gelatinous foreign matter is disadvantageously formed.

If the gelatinous foreign matter begins to be formed during the production of resin-coated paper, the following serious problem is caused: the resins in the coating are thinned to form streaks and are cracked in some cases, so that no uniform resin-coated paper can be obtained. In a support for image-forming material which is obtained by coating one side of base paper with a resin layer made of a resin composition composed mainly of a polyolefin resin, and coating the other side of the base paper with a resin layer made of a resin composition composed mainly of a polyethylene type resin, the presence of the gelatinous foreign matter in the coating resin layer on the side reverse to the side on which an image-forming layer is to be formed (the former side and the latter side are hereinafter abbreviated as “the reverse side” and “the obverse side”, respectively) deteriorates the appearance of an image-forming material having said support to destroy the commercial value of the image-forming material. In particular, if the gelatinous foreign matter is formed in the resin layer on the reverse side (hereinafter abbreviated as “the reverse resin layer”), the following problem is caused: when an image-forming layer, in particular, a silver halide photographic layer, is formed on the resin layer on the obverse side (hereinafter abbreviated as “the obverse resin layer”) by coating, the coating is disturbed by influences brought about from the reverse side, to become nonuniform, resulting in fatal deterioration in quality. Therefore, it has been necessary to take a sufficient measure to prevent the formation of the gelatinous foreign matter.

Accordingly, the present inventors investigated the cause of formation of the gelatinous foreign matter. To begin with, when base paper is coated with a molten polyethylene type resin by extruding the molten resin thereon, this procedure is carried out at a temperature considerably higher than the melting point of the polyethylene type resin. For example, the melting points of a low-density polyethylene resin and a high-density polyethylene resin are approximately 105°–110° C. and approximately 120°–130° C., respectively, while the temperature at melt extrusion through an extruder die has to be about 300° C. for coating with a thin film. It is known that in general, polyethylene molecules contain, besides a linear chain of carbons constituting a polymer of ethylene monomers, unsaturated bonds such of carbon-carbon double bonds, and side chains of carbons formed by attachment of a carbon skeleton of methyl or higher-order group. The following conjecture is given. A temperature of about 300° C. is suitable for polyethylene from the viewpoint of work efficiency but is in a range where activation is accelerated at molecular level. Particularly in long-term operation, radicals are liable to be formed in the vicinity of the unsaturated bonds and the side chains of carbons in the molecules owing to factors such as the flowability change of the molten polyethylene type resin, and the radicals undergo chain reaction. Consequently, the molten polyethylene type resin undergoes cross-linking reaction to accumulate and reside inside an extruder. In some cases, the reaction product appears as a gelatinous foreign matter when extruded together with a film.

As a method for preventing the formation of such a gelatinous foreign matter, there is a method of carrying out the operation at a lowered extrusion temperature. But in this case, the adhesion between the polyethylene type resin and the paper is deteriorated, so that the processing rate is limited for maintaining a necessary adhesion, resulting in a low productivity. Disassembly and cleaning of the extruder at short intervals is effective but lowers the productivity unavoidably. The investigation by the present inventors revealed that the incorporation of antioxidant into the polyethylene type resin composition is effective to a certain extent in preventing the formation of the gelatinous foreign matter. But the following problem is caused: the antioxidant has to be added in a large amount, and in this case, the adhesion between the base paper and the resin layer becomes very insufficient. Particularly when resin-coated paper is produced under a high-speed condition of a base paper running rate of 150 m/min or more, there is caused a problem of further deterioration of the adhesion between the base paper and the resin layer.

Thirdly, resin-coated paper as a support for image-forming material is required to have an excellent smoothness of the obverse resin surface. On the other hand, a support having a weight up to user’s standard is desired for the texture, hand feeling, nerve and the like of an image-forming material. The most effective method for improving the smoothness of resin-coated paper is to increase the coating weight of the obverse resin layer. But when the basis weight of base paper is reduced in proportion to the increase of the coating weight of the obverse resin layer, the above-mentioned texture, hand feeling, nerve and the like are markedly deteriorated. Therefore, it is preferable to choose a method of reducing the coating weight of the reverse resin layer. However, in this case, the following problem is caused: an image-forming material obtained by using the resin-coated paper as a support curls to the image-forming layer side, so that its handling becomes very difficult.

Therefore, the following method is employed: a resin composition composed mainly of a low-density polyethylene type resin and a high-density polyethylene type resin is used as a resin composition for the reverse resin layer of a resin-coated paper type support for image-forming material, and the density of the reverse resin layer is increased by increasing the content of the high-density polyethylene type resin in the resin composition, whereby an image-forming material obtained by using the resin-coated paper as a support is flattened by preventing its curling or is curled a little to the reverse side, namely, the curling properties of the image-forming material are improved. However, in this case, the following problem is caused; in proportion as the content of the high-density polyethylene type resin in the resin composition is increased to, for example, 60% by weight or more, in particular, 70% by weight or more, the cuttability of a resin-coated paper type support for image-forming material obtained by coating with the resin composition or an image-forming material having the support for image-forming material is deteriorated. In detail, the following problem is often caused: when the support for image-forming material or the image-forming material having the support for image-forming material is cut to a desired size with a cutter such as a guillotine cutter or precision print cutter, the support for image-forming material cannot be accurately cut, and whiskery projections are formed on the cut surface of the support for image-forming material to deteriorate the commercial value.

The following problem is also caused: in proportion as the coating weight of the reverse resin layer of the resin-coated paper type support for image-forming material is reduced, the adhesion between base paper and the resin layer is deteriorated. This problem of the adhesion between the base paper and the resin layer becomes more remarkable with an increase of the running speed of the base paper.

Accordingly, an object of the present invention is to provide a resin-coated paper type support for image-forming material obtained by using paper as a substrate, coating the obverse side of this base paper with a resin composition composed mainly of a polyolefin resin, and coating the reverse side of the base paper with a resin composition composed mainly of polyethylene type resins, which support is characterized as follows: during its production, cooling roll stains are hardly made, so that no problem is caused by their transfer; no gelatinous foreign matter is formed in the resin layer on the side reverse to the side on which an image-forming layer is to be formed; and the support is satisfactory in performance characteristics such as curling properties, cuttability and the adhesion between the reverse resin layer and the base paper, and can be produced rapidly and stably. Other objects of the present invention will be apparent from the following statement of the description.

[DISCLOSURE OF THE INVENTION]

The present inventors earnestly investigated for solving the above problems, and consequently found that a desired resin-coated paper suitably usable as a support for image-forming material can be obtained by coating one side of base paper with a resin layer comprising a specific high-density polyethylene and a specific medium-density polyethylene or low-density polyethylene.

In detail, the present invention relates to resin-coated paper obtained by forming a resin layer on one side of base paper, said resin layer being made of a polyethylene type resin composition obtained by melt-blending 90 parts by weight to 65 parts by weight of a high-density polyethylene resin having a melt flow rate (prescribed in JIS K 6760) of 10.0 g/10 min to 40.0 g/10 min and a density of 0.960 g/cm$^3$ or more and 10 part by weight to 35 parts by weight of a low-density polyethylene resin or medium-density polyethylene resin, which has a melt flow rate of 0.2 g/10 min to 2 g/10 min, a density of 0.935 g/cm$^3$ or less, a percentage of molecules with a molecular weight of 500,000 or more of 10% by weight or more, and a critical shear rate of 0.5 (l/sec) or less, and said resin composition obtained by the melt-blending having a critical shear rate of 10 (l/sec) or less.

The present invention relates also to a process for producing resin-coated paper which comprises melt-blending 90 parts by weight to 65 parts by weight of a high-density polyethylene resin having a melt flow rate of 10.0 g/10 min to 40.0 g/10 min and a density of 0.960 g/cm$^3$ or more and 10 part by weight to 35 parts by weight of a low-density polyethylene resin or medium-density polyethylene resin, which has a melt flow rate of 0.2 g/10 min to 2 g/10 min, a density of 0.935 g/cm$^3$ or less, a percentage of molecules with a molecular weight of 500,000 or more of 10% by weight or more, and a critical shear rate of 0.5 (l/sec) or less; and melt-extruding the resulting polyethylene type resin composition to coat base paper therewith, said resin composition obtained by the melt-blending having a critical shear rate of 10 (l/sec) or less.

In addition, the present invention relates to resin-coated paper wherein a resin layer formed on base paper has a melt flow rate of 1.0–40 g/10 min, a density of 0.930–0.971 g/cm$^3$ and a critical shear rate of 20 (l/sec) or less.

[BEST MODE FOR CARRYING OUT THE INVENTION]

Figure 1:
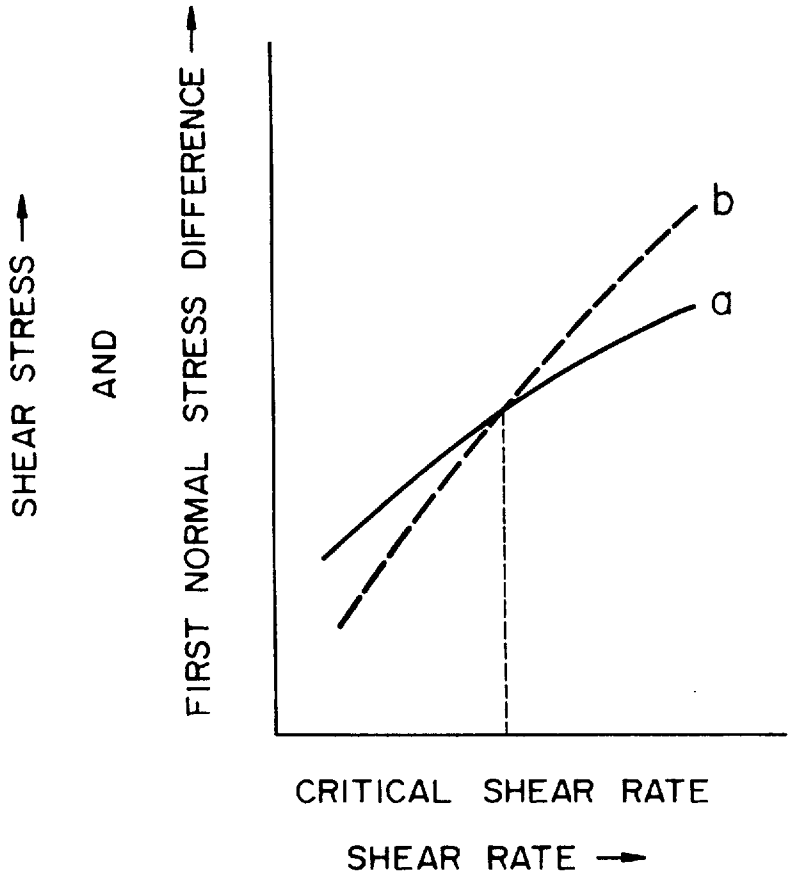
FIG. 1 is a graph showing the relationship between [shear stress and first normal stress difference] and [shear rate]: the axis of ordinate refers to the shear stress and the first normal stress difference, and the axis of abscissa to the shear rate. In the figure, a shows the shear stress and b the first normal stress difference.

The present invention is explained below in detail.

In the present description, the term “critical shear rate” means a shear rate at which shear stress and first normal stress difference become equal to each other which are measured at 240° C. by the method described hereinafter, by means of a cone plate type rotating viscometer.

The high-density polyethylene resin used in the first resin layer in the resin-coated paper of the present invention has a melt flow rate prescribed in JIS K 6760 (hereinafter referred to as MFR) in the range of 10.0 g/10 min to 40.0 g/10 min, preferably 10.0 g/10 min to 30.0 g/10 min, and a density of 0.960 g/cm$^3$ or more, preferably 0.962 g/cm$^3$ or more. In the present invention, the critical shear rate of the high-density polyethylene is preferably approximately 10–100 (l/sec), more preferably approximately 20–80 (l/sec). As the high-density polyethylene resin (hereinafter referred to as HDPE) having the above-mentioned physical properties, there are exemplified, besides HDPE itself, copolymers obtained from ethylene as main constituent and a lower α-olefin such as propylene or butene, and mixtures thereof.

When the MFR of the HDPE is less than 10.0 g/10 min, the adhesion between the base paper and the resin layer and the molding processability are deteriorated. When the MFR is more than 40.0 g/10 min, the ease of blending of the resins, the molding processability, and the like are deteriorated. When the density is less than 0.960 g/cm$^3$, the fabrication properties such as cuttability are deteriorated, so that no desirable result can be obtained. HDPE’s various in their MFR, density, molecular weight and molecular weight distribution may be used singly or as a mixture thereof so long as the MFR and density of these resins are in the above ranges.

On the other hand, the low-density polyethylene resin (hereinafter referred to as LDPE) or the medium-density polyethylene resin (hereinafter referred to as MDPE), which is used in the resin layer, has an MFR in the range of 0.2 g/10 min to 2 g/10 min, preferably less than 1.0 g/10 min and not less than 0.2 g/10 min; a density of 0.935 g/cm$^3$ or less, preferably 0.930 g/cm$^3$ or less; a percentage of molecules with a molecular weight of 500,000 or more of 10% by weight or more, preferably 12% by weight or more and a critical shear rate of 0.5 (l/sec) or less, preferably 0.4 (l/sec) or less.

When the MFR of the LDPE is less than 0.2 g/10 min, the ease of blending of the resins, the adhesion between the base paper and the resin layer, the molding processability, etc. are deteriorated. When the MFR is more than 2 g/10 min, the molding processability is deteriorated. When the density is more than 0.935 g/cm$^3$, the adhesion between the base paper and the resin layer, the molding processability, etc. are deteriorated, so that no desirable result can be obtained. When the percentage of molecules with a molecular weight of 500,000 or more of the resin is less than 10% by weight, the molding processability, in particular, neck-in becomes unsatisfactory. Therefore, it is not desirable. The molecular weight is measured by a GPC method using 150-C mfd. by Waters Co. (column: GMH-XL HT 8 mmϕ×30 cm×3 columns, mfd. by Tosoh Ltd., solvent; 1,2,4-trichlorobenzene, temperature: 135° C., flow rate: 1 ml/min).

The critical shear rate of the LDPE or MDPE has to be 0.5 (l/sec) or less. When the critical shear rate is more than 0.5 (l/sec), there are caused problems such as low molding processability, the formation of a gel in the resin layer, etc.

FIG. 1 is a graph showing the relationship between [shear stress and first normal stress difference] and [shear rate]. In FIG. 1, the axis of ordinate refers to the shear stress and the first normal stress difference, and the axis of abscissa refers to the shear rate. In FIG. 1, a shows the shear stress and b the first normal stress difference.

In the present invention, the critical shear rate is measured by means of a cone plate type rotating viscometer (Rheometrics Mechanical Spectrometer mfd. by Rheometrics Inc.: diameter of cone plate 25 mm, angle 0.1 rad, temperature 240° C.) and is a shear rate at a point at which the shear stress and the first normal stress difference become equal to each other in FIG. 1 (the intersection of the line a and the line b). The shear stress and the first normal stress difference are calculated by the following equations:

Shear stress=(viscosity)×(shear rate)

First normal stress difference=(Coefficient of first normal stress difference)×$(\text{shear rate})^2$ In the resin layer in the resin-coated paper of the present invention, there is used a compound resin composed of a polyethylene type resin composition prepared by previously melt-blending 90 parts by weight to 65 parts by weight of an HDPE having the above-mentioned physical properties and 10 parts by weight to 35 parts by weight of an LDPE or an MDPE, which has the above-mentioned physical properties. And the critical shear rate of the compound resin has to be 10 (l/sec) or less, particularly preferably 8 (l/sec) or less. When the critical shear rate is more than 10 (l/sec), a gel tends to be formed undesirably. The composition obtained by the melt-blending of the HDPE and the LDPE or MDPE has an MFR of preferably 1.4–36 g/10 min, more preferably 4.0–15 g/10 min, and a density of preferably 0.932–0.970 $g/cm^3$.

It can be speculated that the suppression of gel formation according to the present invention is due to the viscoelastic properties of the resin at a high resin temperature at the time of melt extrusion coating. It is conjectured that properties of the resin change from viscous to elastic at the above-mentioned critical shear rate of 10 (l/sec) or less, so that the gel formation is suppressed by the reduction of the chance of gelation, the grinding and kneading of a gel, etc.

As a method for melt-blending the HDPE and the LDPE or MDPE in the above proportions, there can be employed a simple melt-blending method, a multi-stage melt-blending method, etc. There are used, for example, a Banbury mixer, pressure kneader, heat roller kneader, extruder, twin-screw extruder, etc. When the HDPE and the LDPE or MDPE are formed into a coating by extrusion with an extruder for melt coating, in a dry-blended state without previous melt-blending, the adhesion between the base paper and the resin layer, the ease of blending of the resins, the molding processability, etc. are deteriorated.

Various additives such as ultraviolet absorbers, heat stabilizers, antistatic agents, anti-oxidants, light stabilizers, lubricants, nucleating agents, coloring agents, etc. may be properly incorporated into the polyethylene type resin composition used in the resin layer, so long as they do not lessen the effect of the present invention. These additives may be previously added to the HDPE and the LDPE or MDPE which are used, or they may be added to these resins at the time of melt-blending, or they may be added to the resins at the time of melt extrusion coating, in the form of a so-called master batch prepared by adding the additives to the resins to a high concentration.

As the base paper used in the present invention, there may be used any of natural pulp paper composed mainly of ordinary natural pulp, mixed paper made of natural pulp and synthetic fiber, and synthetic paper made of synthetic pulp, synthetic fiber or synthetic resin film. The base paper may contain sizing agents, reinforcing agents, fillers, fixing agents, pH adjustors, coloring agents, fluorescent whitening agents, etc.

For producing the resin-coated paper of the present invention, there is employed a so-called melt extrusion coating method in which coating is carried out by casting the above-mentioned polyethylene type resin composition in the form of a film onto running base paper through the slit die of a melt extruder. Usually, the melt extrusion temperature is preferably 280° C. to 340° C. It is preferable to subject the base paper to an activating treatment such as corona discharge treatment or flame treatment before coating the base paper with the polyethylene type resin composition. Although the thickness of the resin layer is not particularly limited, the resin layer usually has a coating thickness of approximately 5–50 microns.

In addition, the present inventors conducted earnest research and consequently found that the object of the present invention can be achieved more effectively when the following condition is satisfied: in resin-coated paper obtained by coating each side of base paper with a resin layer made of a resin composition composed mainly of polyethylene type resins, the difference between the coating weight of resins in the resin layer on the side on which an image-forming layer is to be formed, i.e., the second resin layer, and the coating weight of resins in the resin layer on the side reverse to the side on which an image-forming layer is to be formed, i.e., the first resin layer, is 3 $g/m^2$ or more. It was also found that the object of the present invention can be achieved still more effectively when the first resin layer is made of a compound resin composition prepared by previously melt-blending a high-density polyethylene resin and a low-density polyethylene resin or a medium-density polyethylene resin, and the critical shear rate of the compound resin is 10 (l/sec) or less. In addition, it was found that the object of the present invention can be achieved more markedly when as the low-density polyethylene resin or the medium-density polyethylene resin, a polyethylene resin having a melt flow rate of less than 1 g/10 min and not less than 0.2 g/10 min constitutes the compound resin.

As the low-density polyethylene resin or medium-density polyethylene resin for the first resin layer, there can be used various polyethylene resins, for example, high-pressure low-density polyethylene resins (low-density polyethylene resins produced by an autoclave method or a tubular method), linear low-density polyethylene resins, medium-density polyethylene resins, copolymers of ethylene and an α-olefin such as propylene or butylene, carboxy-modified polyethylene resins, and mixtures thereof.

The using ratio, density, MFR and critical shear rate of the low-density polyethylene resin or the medium-density polyethylene resin and the high-density polyethylene resin for the first resin layer were determined from a synthetic viewpoint as a result of experiments carried out by a trial and error method with respect to, for example, the ease of blending of the resins, molding processability and preventive effect on a gelatinous foreign matter in the production of a support for image-forming material, the adhesion between base paper and resin composition layer of the support for image-forming material, and the performance characteristics of the support for image-forming material, such as curling properties, cuttability, hand feeling and nerve, whereby the present invention has been accomplished. In particular, the amount of the high-density polyethylene resin used in the resin composition comprising the high-density polyethylene resin and the low-density polyethylene resin or the medium-density polyethylene resin ranges from 90 parts by weight to 65 parts by weight, preferably from 85 parts by weight to 70 parts by weight, more preferably from 80 parts by weight to 70 parts by weight. When the amount of the resin used is less than 65 parts by weight, the curling properties, cuttability, hand feeling, nerve and the like of the support for image-forming material are disadvantageously deteriorated. When the amount of the resin used is more than 90 parts by weight, the ease of blending of the resins, the molding processability, the adhesion between the base paper and the resin layer, etc. are disadvantageously deteriorated.

The MFR of the high-density polyethylene resin for the first resin layer ranges from 10 g/10 min to 40 g/10 min, preferably from 10 g/10 min to 30 g/10 min. When the MFR of the resin is less than 10 g/10 min, the adhesion between the base paper and the resin layer, high-speed processability, etc. are disadvantageously deteriorated. When the MFR of the resin is more than 40 g/10 min, the ease of blending of the resins, the molding processability, etc. are deteriorated, and the curling properties tend to be deteriorated. Therefore, it is not desirable. The density of the high-density polyethylene resin is 0.960 $g/cm^3$ or more. When the density is less than 0.960 $g/cm^3$, the curling properties, the nerve, etc. are disadvantageously deteriorated. The density is preferably 0.962 $g/cm^3$ or more.

On the other hand, the MFR of the low-density polyethylene resin or medium-density polyethylene resin for the first resin layer ranges from 0.2 g/10 min to 2 g/10 min. When the MFR is less than 0.2 g/10 min, the ease of blending of the resins, the adhesion between the base paper and the resin layer, high-speed processability, etc. are disadvantageously deteriorated. When the MFR is more than 2 g/10 min, the molding processability is deteriorated, and the curling properties tend to be deteriorated. Therefore, it is not desirable. The MFR is preferably less than 1 g/10 min and not less than 0.2 g/10 min. The density of the low-density polyethylene resin or the medium-density polyethylene resin is 0.935 $g/cm^3$ or less. When the density is more than 0.935 $g/cm^3$, the molding processability of the resin composition, the adhesion between the base paper and the resin layer, etc. are disadvantageously deteriorated. The density is preferably 0.930 $g/cm^3$ or less. The percentage of molecules with a molecular weight of 500,000 or more of these resins is 10% by weight or more, preferably 12% by weight or more. When the percentage of molecules with a molecular weight of 500,000 or more of the resins is less than 10% by weight, the molding processability, in particular, neck-in becomes unsatisfactory. Therefore, it is not desirable.

As described above, the first resin layer is formed preferably by using a compound resin prepared by previous melt-blending. As a method for preparing the compound resin by previously melt-blending the low-density polyethylene resin or the medium-density polyethylene resin and the high-density polyethylene resin, there can be employed a simple melt-blending method, a multi-stage melt-blending method, etc. There is advantageously used, for example, a method comprising melt-blending predetermined amounts of the low-density polyethylene resin or the medium-density polyethylene resin with the high-density polyethylene resin and optionally various additives such as an antioxidant, lubricant and the like by means of an extruder, twin-screw extruder, heat roller kneader, Banbury mixer, pressure kneader, or the like, and pelletizing the resulting blend. When the polyethylene type resins are formed into a coating by melt extrusion by charging them in a simple blended state into a melt extruder directly instead of using them in the form of a compound resin, the adhesion between the base paper and the resin layer, the ease of blending of the resins, the molding processability, etc. are disadvantageously deteriorated.

The critical shear rate of the aforesaid compound resin is suitably 10 (l/sec) or less, preferably 8 (l/sec) or less, particularly for preventing a gelatinous foreign matter from being formed with the lapse of time during extrusion melt coating. When the critical shear rate is more than 10 (l/sec), the gelatinous foreign matter is undesirably formed. It can be speculated that the preventive effect of the present invention on the formation of the gelatinous foreign matter is due to the viscoelastic properties of the resin at a high resin temperature at the time of melt extrusion coating. It is conjectured that properties of the resin change from viscous to elastic at the critical shear rate, so that the effect is brought about by the reduction of the chance of gelation, the improvement of grinding and kneading of a gel, etc.

As described above, the side of base paper of the resin-coated paper of the present invention on which an image-forming layer is to be formed, is preferably coated with a resin composition composed mainly of one or more polyethylene type resins. As the polyethylene type resins, there can be used various polyethylene type resins, for example, low-density polyethylene resins, medium-density polyethylene resins, high-density polyethylene resins, linear low-density polyethylenes, copolymers of ethylene and an α-olefin such as propylene or butylene, carboxy-modified polyethylene resins, and mixtures thereof. Polyethylene type resins various in their density, MFR, molecular weight and molecular weight distribution can be used, though usually, there can be advantageously used polyethylene type resins having a density in the range of 0.91 $g/cm^3$ to 0.97 $g/cm^3$, an MFR of 1 g/10 min to 30 g/10 min and a molecular weight in the range of 20,000 to 250,000, singly or as a mixture thereof.

The difference between the coating weight of the resin(s) in the second resin layer and the coating weight of the resins in the first resin layer is preferably 3 $g/m^2$, more preferably 5 $g/m^2$, most preferably 7 $g/m^2$. When the difference in resin coating weight between the obverse and reverse sides is less than 3 $g/m^2$, an image-forming material obtained by using the resulting resin-coated paper as a support curls to the side reverse to its image-forming layer, resulting in a problem of very difficult handling of the image-forming material. Moreover, the cuttability of the support for image-forming material or the image-forming material having the support for image-forming material is undesirably deteriorated. In detail, the following problem is often caused: when the support for image-forming material or the image-forming material having the support for image-forming material is cut into a desired size with a cutter such as a guillotine cutter or precision print cutter, the support for image-forming material cannot be accurately cut, and whiskery projections are formed on the cut surface of the support for image-forming material to impair the commercial value. The support for image-forming material according to the present invention or an image-forming material having this support for image-forming material can have a satisfactory cut surface.

As described above, the support for image-forming material is produced preferably by a so-called melt extrusion coating method in which coating is carried out by casting the polyethylene type resin composition in the form of a film onto running base paper through the slit die of a melt extruder. In this case, the temperature of the molten film is preferably 280° C. to 340° C. As the slit die, flat dies of T-die, L-die and fishtail die are preferable. The diameter of the slit oriffice is preferably 0.1 mm to 2 mm. It is preferable to subject the base paper to an activating treatment such as corona discharge treatment or flame treatment before coating the base paper with the resin composition. It is also possible to blow an ozone-containing gas against the molten resin composition on the side on which the composition is brought into contact with the base paper, and then coat the running base paper with a resin layer, as described in Japanese Patent Post-examined Publication No. 61-42254. The base paper is coated with the first and second resin layers preferably by a so-called tandem extrusion coating method in which the resin layers are formed by extrusion coating one after another, preferably in succession. If necessary, the base paper may be coated by a multilayer extrusion coating method in which a multilayer structure composed of two or more layers is given to each of the first and second resin layers. The surface of the second obverse resin layer of the support for image-forming material can be processed into a glossy surface, the finely rough surface described in Japanese Patent Post-examined Publication No. 62-19732, a mat surface, a silky surface or the like. Usually, the first resin layer is preferably processed into a dull surface. The thickness of the second resin layer is preferably in the range of 9 $\mu$m to 100 $\mu$m, more preferably 12 $\mu$m to 55 $\mu$m. The thickness of the first resin layer is preferably in the range of 5 $\mu$m to 95 $\mu$m, more preferably 8 $\mu$m to 50 $\mu$m.

Various additives may be incorporated into the first and second resin layers of the support for image-forming material. The following various additives may be incorporated in proper combination: for example, the white pigments (e.g. titanium oxide, zinc oxide, talc and calcium carbonate), the fatty acid amides (e.g. stearamide and arachidamide) and the fatty acid metal salts (e.g. zinc stearate, calcium stearate, aluminum stearate, magnesium stearate, zinc palmitate, zinc myristate and calcium palmitate), which are described in Japanese Patent Post-examined Publication Nos. 60-3430, 63-11655, 1-38291 and 1-38292 and Japanese Patent Unexamined Publication No. 1-105245; the various antioxidants (e.g. hindered phenols, hindered amines, and phosphorus- or sulfur-containing antioxidants), the blue pigments and dyes (Cobalt Blue, Ultramarine, Blue and Phthalocyanine Blue), magenta pigments and dyes (e.g. Cobalt Violet, Fast Violet and Manganese Violet), which are described in Japanese Patent Unexamined Publication No. 1-105245; and the fluorescent whitening agents and ultraviolet absorbers, which are described in Japanese Patent Unexamined Publication No. 2-254440. The additives are incorporated preferably in the form of a master batch or compound of the resins. In particular, for incorporating the additives into the compound resin composition for the first resin layer which is used for carrying out the present invention, the additives may be previously added to the high-density polyethylene resin and the low-density polyethylene resin or the medium-density polyethylene resin, or they may be added at the time of preparing the compound resin, or they may be added to the resins at the time of melt extrusion coating, in the form of a master batch prepared by adding the additives to the resins to a high concentration.

As the base paper, natural pulp paper composed mainly of ordinary natural pulp (base paper composed mainly of natural pulp is hereinafter abbreviated as "basis paper") is preferable. Mixed paper made of natural pulp and synthetic fiber, or so-called synthetic paper made of synthetic pulp, synthetic fiber or synthetic resin film may also be used. Although the thickness of the base paper is not particularly limited, its basis weight is preferably 40 $g/m^2$ to 250 $g/m^2$.

As pulp constituting the preferably used basis paper, there is advantageously used such properly chosen natural pulp as is described in Japanese Patent Unexamined Publication Nos. 58-37642, 60-67940, 60-69649 and 61-35442. As the natural pulp, there are advantageously used wood pulps such as softwood pulp, hardwood pulp and softwood-hardwood mixed pulp which have been subjected to, for example, usual bleaching treatment with chlorine, a hypochlorite or chlorine dioxide, alkali extraction, alkali treatment, and optionally oxidation bleaching with hydrogen peroxide, oxygen or the like, and a combination of these treatments. There may be used various pulps such as kraft pulp, sulfite pulp and soda pulp.

Various additive may be incorporated into the basis paper at the time of preparing a stuff slurry. It is advantageous to incorporate, for example, the following additives in proper combination: sizing agents such as fatty acid metal salts and/or fatty acids, the alkylketene dimer emulsions or the epoxidized higher fatty acid amides, which are described in Japanese Patent Post-examined Publication No. 62-7534, alkenyl or alkyl succinate anhydride emulsions, rosin derivatives, etc.; dry-reinforcing agents such as anionic, cationic or amphoteric polyacrylamides and poly(vinyl alcohol)s, cationic starches, vegetable galactomannans, etc.; wet-reinforcing agents such as polyamine polyamide epichlorohydrin resins, etc.; fillers such as clay, kaolin, calcium carbonate, titanium oxide, etc.; fixing agents such as water-soluble aluminum salts (e.g. aluminum chloride and aluminum sulfate); pH adjustors such as sodium hydroxide, sodium carbonate, sulfuric acid, etc.; and the color pigments, chakuryo dyes, fluorescent whitening agents and the like, which are described in Japanese Patent Unexamined Publication Nos. 63-204251 and 1-266537.

Various water-soluble polymers, antistatic agents and additives may be incorporated into the basis paper with a spray or a tab size press. It is advantageous to incorporate the following materials in proper combination: water-soluble polymers such as the starch type polymers, poly(vinyl alcohol) type polymers, gelatin type polymers, polyacrylamide type polymers and cellulose type polymers, which are described in Japanese Patent Unexamined Publication No. 1-266537; antistatic agents such as alkali metal salts (e.g. sodium chloride and potassium chloride), alkaline earth metals (e.g. calcium chloride and barium chloride), colloidal metal oxides (e.g. colloidal silica), organic antistatic agents (e.g. polystyrene sulfonates), etc.; emulsions and latices, such as emulsions or latices of ethylene-vinyl acetate copolymers, petroleum resin emulsions, etc.; pigments such as clay, kaolin, talc, barium sulfate, titanium oxide, etc.; pH adjustors such as hydrochloric acid, phosphoric acid, citric acid, sodium hydroxide, etc.; and the above-exemplified additives such as the color pigments, color dyes and fluorescent whitening agents.

The basis paper is preferably one which has a smooth surface with a Bekk smoothness (prescribed in JIS P 8119) of 100 seconds or more, more preferably 200 seconds or more. For producing base paper having a Bekk smoothness of 100 seconds or more, there is usually used, in a large proportion, hardwood pulp which is composed of short fiber and easily gives smoothness, and the hardwood pulp is beaten with a beater so as to be decreased in long fiber as much as possible. Specifically, it is preferable to beat the pulp so as to adjust the fiber length and freeness of the pulp after the beating to a 42-mesh residue of 20 to 45%, and 200 to 350 CSF, respectively. Then, a stuff slurry containing internal additives is made into paper so as to give uniform formation, with a conventional paper machine such as a Fourdrinier paper machine, cylinder paper machine or the like by such a suitable paper making method as is described in Japanese Patent Unexamined Publication Nos. 58-37642, 61-260240, 61-284762, etc. After the paper making, the paper is calendered with a machine calender, super calender, hot calender or the like. Thus, the base paper having a Bekk smoothness of 100 seconds or more can be produced.

On the second resin layer can be formed, by coating, such an undercoating layer as is described or exemplified in Japanese Patent Unexamined Publication Nos. 61-84643, 1-92740, 1-102551 and 1-166035, etc., after subjecting the second resin layer to an activating treatment such as corona discharge treatment, flame treatment, or the like. For preventing electrification, any of various back coating layers can be formed by coating on the first resin layer of the resin-coated paper of the present invention after subjecting the first resin layer to an activating treatment such as corona discharge treatment, flame treatment, or the like. Into the back coating layer may be incorporated in proper combination the inorganic antistatic agents, organic antistatic agents, hydrophilic binders, latices, curing agents, pigments, surfactants, etc., which are described, for example, in Japanese Patent Post-examined Publication Nos. 52-18020, 57-9059, 57-53940 and 58-56859, and Japanese Patent Unexamined Publication Nos. 59-214849 and 58-184144.

The support for image-forming material can be used for various purposes by forming thereon various photographic layers by coating, for example, it can be used for the production of color print paper, monochrome print paper, photocomposing print paper, photocopying print paper, reversal photographic material, negative or positive for silver salt diffusion transfer process, printing material, etc. For example, a silver chloride, silver bromide, silver chlorobromide, silver iodo-bromide, silver chloroiodobromide emulsion layer can be formed. A multilayer silver halide color photographic layer can be formed by incorporating color couplers into silver halide photographic emulsions. A photographic layer for silver salt diffusion transfer process can be formed. As a bonding agent for the above photographic layers, there can be used, besides ordinary gelatin, hydrophobic high-molecular weight substances such as poly(vinylpyrrolidone)s, poly(vinyl alcohol)s, sulfate ester compounds of polysaccharides, etc. Various additives may be incorporated into the above-mentioned photographic layers. For example, the following additives may be incorporated in proper combination: sensitizing dyes such as cyanine dyes, merocyanine dyes, etc.; chemical sensitizers such as water-soluble gold compounds, sulfur compounds, etc.; anti-fogging agents or stabilizers, such as hydroxy-triazolopyrimidine compounds, mercapto-heterocyclic compounds, etc.; hardening agents such as formaldehyde, vinylsulfone compounds, aziridine compounds, etc.; coating aids such as alkylbenzenesulfonates, sulfosuccinic acid ester salts, etc.; antifouling agents such as dialkylhydroquinone compounds, etc.; fluorescent whitening agents; sharpness improving dyes; antistatic agents; pH adjustors; fogging agents; and water-soluble iridium, water-soluble rhodium compounds, etc., which are incorporated at the time of production and dispersion of silver halide.

The photographic materials according to the present invention can be subjected to such treatments (e.g. exposure, development, termination, fixing, bleaching and stabilization) as are described in Goro Miyamoto "Shashin Kankozairyo To Toriatsukaiho (Photosensitive Materials and Handling Methods)", Shasin Gijutsu Koza 2, KYORITSU-SHUPPAN Ltd. The multilayer silver halide color photographic material may be treated with a developing solution containing a development accelerator such as benzyl alcohol, a thallium salt, phenidone, or the like. It may be treated with a developing solution containing substantially no benzyl alcohol.

The support for image-forming material can be used as various supports for image-receiving material for heat transfer recording, by forming thereon various image-receiving layers for heat transfer recording by coating. As synthetic resins used in the image-receiving layers for heat transfer recording, there are exemplified resins having ester linkages, such as polyester resins, poly(acrylic ester) resins, polycarbonate resins, poly(vinyl acetate) resins, poly(vinyl butyrate) resins, styrene acrylate resins, vinyltoluene acrylate resins, etc.; resins having urethane linkages, such as polyurethane resins, etc.; resins having amide linkages, such as polyamide resins, etc.; resins having urea linkages, such as urea resins, etc.; polycaprolactam resins; styrene-based resins; poly(vinyl chloride) resins; vinyl chloride-vinyl acetate copolymer resins; and polyacrylonitrile resins. In addition to these resins, mixtures or copolymers of the resins, and the like can be used.

Besides the above-exemplified synthetic resins, mold release agents, pigments and the like may be incorporated into the image-receiving layers for heat transfer recording. The aforesaid mold release agents include, for example, solid waxes such as polyethylene waxes, amide waxes, Teflon powder, etc.; fluorine-containing or phosphate ester type surfactants; and silicone oils. Of these mold release agents, the silicone oils are the most preferable. As the aforesaid silicone oils, oily ones may be used, though curable ones are preferable. As the curable silicone oils, there are exemplified reaction-curing type ones, light-curing type ones and catalyst-curing type ones. The reaction-curing type silicone oils are particularly preferable. The reaction-curing type silicone oils include amino-modified silicone oils, epoxy-modified silicone oils, etc. The amount of the aforesaid reactive silicone oil added is preferably 0.1 to 20 wt % based on the weight of the image-receiving layer. As the aforesaid pigments, extender pigments such as silica, calcium carbonate, titanium oxide, zinc oxide, etc. are preferable. The thickness of the image-receiving layer is preferably 0.5 to 20 $\mu$, more preferably 2 to 10 $\mu$m.

The support for image-forming material can be used as various supports for ink jet printing material by forming thereon various ink-receiving layers by coating. Various binders may be incorporated into the ink-receiving layers in order to improve the drying properties of ink, the sharpness of image, etc. Specific examples of the binders are aqueous adhesives of various gelatins such as lime-treated gelatin, acid-treated gelatin, enzyme-treated gelatin, gelatin derivatives, and reaction products of gelatin with anhydride of a dibasic acid (e.g. phthalic acid, maleic acid or fumaric acid), etc.; ordinary polyevinyl alcohol)s various in their degree of saponification, carboxy-modified, cation-modified and amphoteric poly(vinyl alcohol)s, and derivatives thereof; starches such as oxidized starchs, cationized starches, etherified starches, etc.; cellulose derivatives such as carboxymethyl cellulose, hydroxyethyl cellulose, etc.; synthetic polymers such as poly(vinylpyrrolidone)s, poly (vinylpyridium halide)s, poly(sodium acrylate)s, acrylic acid-methacrylic acid copolymer salts, poly(ethylene glycol)s, poly(propylene glycol)s, poly(vinyl ether)s, alkyl vinyl ether-maleic anhydride copolymers, styrene-maleic anhydride copolymers and salts thereof, poly (ethyleneimine)s, etc.; conjugated diene copolymer latices of styrene-butadiene copolymers, methyl methacrylate-butadiene copolymers, etc.; vinyl acetate-based polymer latices of poly(vinyl acetate)s, vinyl acetate-maleic ester copolymers, vinyl acetate-acrylic ester copolymers, ethylene-vinyl acetate copolymers, etc.; latices of acrylic polymer or copolymers such as acrylic ester polymers, methacrylic ester polymers, ethylene-acrylic ester copolymers, styrene-acrylic ester copolymers, etc.; vinylidene chloride-based copolymer latices or functional group-modified polymer latices obtained from these various polymers by the use of a monomer containing a functional group such as carboxyl group; and thermosetting resins such as melamine resins, urea resins, etc.; synthetic resin-based adhesives of poly(methyl methacrylate)s, polyurethane resins, unsaturated polyester resins, vinyl chloride-vinyl acetate copolymers, poly(vinyl butyral)s, alkyd resins, etc.; and the inorganic binders such as alumina sols, silica sols, etc., which are described in Japanese Patent Post-examined Publication No. 3-24906, Japanese Patent Unexamined Publication No. 3-281383, Japanese Patent Application No. 4-240725, etc. The above binders may be incorporated singly or in combination.

Besides the binders, various additives may be incorporated into the ink-receiving layer of the ink jet printing material. For example, the following various additives may be incorporated in proper combination: surfactants such as anionic surfactants (e.g. long-chain alkylbenzenesulfonates, and long-chain and preferably branched alkyl sulfosuccinic acid ester salts), nonionic surfactants [e.g. poly(alkylene oxide) ethers of phenols containing a long-chain and preferably branched alkyl group, and poly(alkylene oxide) ethers of long-chain alkyl alcohols], and the fluorinated surfactants which are described in Japanese Patent Post-examined Publication No. 47-9303, U.S. Pat. No. 3,589,906, etc.; silane coupling agents such as γ-aminopropyltriethoxysilane, N-β(aminoethyl) γ-aminopropyltrimethoxysilane, etc.; hardeners for polymers, such as active halides, vinylsulfone compounds, aziridine compounds, epoxy compounds, acryloyl compounds, isocyanate compounds, etc.; antiseptics such as the P-hydroxybenzoic acid ester compounds, benzisothiazolone compounds, isothiazolone compounds, etc., which are described in Japanese Patent Unexamined Publication No. 1-102551; the color pigments, color dyes, fluorescent whitening agents and the like, which are described in Japanese Patent Unexamined Publication Nos. 63-204251 and 1-266537, etc.; anti-yellowing agents such as sodium hydroxymethanesulfonate, sodium P-toluenesulfinate, etc.; ultraviolet absorbers such as benzotriazole compounds having a hydroxy-di-alkylphenyl group at the 2-position, etc.; antioxidants such as the poly(hindered phenol) compounds described in Japanese Patent Unexamined Publication No. 1-105245; pencil writing agents such as organic or inorganic fine particles with a particle size of 0.2 $\mu$m to 5 $\mu$m of starch particles, barium sulfate, silicon dioxide, etc., and the organopolysiloxane compounds described in Japanese Patent Post-examined Publication No. 4-1337; and pH adjustors such as sodium hydroxide, sodium carbonate, sulfuric acid, hydrochloric acid, phosphoric acid, citric acid, etc.; octyl alcohol; and silicone-based defoaming agents.

In addition, the present inventors earnestly studied for providing an extrusion melt coating method which is such that in the production of polyethylene-type-resin-coated paper by extrusion melt coating, the method does not deteriorates the productivity, gives a good molding processability of a resin layer and a good adhesion between the resin layer and base paper, and prevents gel formation in the resin layer. Consequently, it was found that the above purpose can be achieved in the following manner: in a process for producing resin-coated paper by extrusion-coating one side of base paper with a polyethylene type resin, the polyethylene type resin is melt-extruded from an extruder at a screw revolution rate of the extruder which is higher than critical revolution rate (Nc).

The aforesaid critical revolution rate (Nc) is calculated by the following method:

$$Nc = \frac{60 \cdot H \cdot CSR}{\pi \cdot D} \quad (1)$$

wherein

Nc: critical screw revolution rate (rpm),

CSR: the critical shear rate of the resin (l/sec),

H: screw channel depth in the lower part of a hopper (cm),

D: barrel bore (cm).

The screw revolution rate of the extruder used in the present invention can easily be measured with a commercial revolution indicator provided in the extruder.

When the screw revolution rate of the aforesaid extruder is not higher than the critical revolution rate calculated by the above formula (1), the prevention of gel formation in the resin layer becomes insufficient. Therefore, it is not desirable.

In practice, for extending the operation range during extrusion melt coating, the critical revolution rate is preferably low. As a method for reducing the critical revolution rate, methods such as a method using resin having as low a critical shear rate as possible within the range specified in the present invention may be used singly or in combination of two or more thereof.

For extrusion-coating base paper with a polyethylene type resin melt-extruded through the die of the aforesaid extruder, the base paper may be extrusion-coated with the resin either directly or after subjecting the surface to be bonded of the base paper previously to a conventional surface-activating treatment such as corona discharge treatment, flame treatment, anchor coat treatment or the like in order to improve the adhesion between the base paper and the polyethylene type resin.

The extrusion coating can be carried out using conventional method and apparatus. For example, it is carried out by extruding the polyethylene type resin into a molten thin film through the die of the extruder at a resin temperature of 280°–340° C., conducting the molten thin film to a pressure roll, and extrusion-coating the base paper conducted to the pressure roll without or after the above-mentioned surface-activating treatment, with the molten thin film through the pressure roll and a cooling roll.

Although the thickness of the aforesaid polyethylene type resin layer is not particularly limited, it is usually in the thickness range of approximately 5–50$\mu$.

As the polyethylene type resin used as the resin layer, a high-density polyethylene and a low-density polyethylene or a medium-density polyethylene are used.

For making the basis paper preferably used in the present invention, there can be used conventional paper machines such as a Fourdrinier paper machine, cylinder paper machine, etc.

Furthermore, as a result of earnest investigation by the present inventors, it was found that the object of the present invention can be achieved particularly effectively in the case of a substrate having a film thickness nonuniformity index Rpy in the paper making direction (defined below) of 140 mV or less.

The term "film thickness nonuniformity index Rpy" used in the present description is defined as follows. That is, there is used a film thickness measuring instrument in which a sample is run between two spherical feelers, and the variation of the thickness of the sample is measured in the form of electrical signals through an electronic micrometer. In a sensitivity range of the electronic micrometer of ±15 $\mu$m/±3V, after zero adjustment, scanning is carried out in the paper making direction at a constant rate of 1.5 m/min to measure the variation of the thickness of the sample in the paper making direction. The measurement signal values thus obtained are subjected to fast Fourier transformation with an FFT analyzer by using a hanning window as a time window. Power spectrum (unit: $mV^2$) is determined on the basis of arithmetic mean of 128 times of integration, and power values in a frequency range of 2 Hz to 25 Hz are summed up. The sum is multiplied by ⅔ and the square root of the product is calculated. The value thus obtained is referred to as "film thickness nonuniformity index Rpy" (unit: mV).

Specifically, the film thickness nonuniformity index Rpy is determined in the following manner. There is used a film thickness measuring instrument (mfd. by Anritsu Corp.) in which a sample is run between two spherical feelers with a diameter of about 5 mm having a measuring pressure of about 30 g/stroke, and the variation of the thickness of the sample is measured in the form of electrical signals through an electronic micrometer. In a sensitivity range of the electronic micrometer of ±15 $\mu$m/±3V, after zero adjustment, scanning is carried out in the paper making direction at a constant rate of 1.5 m/min to measure the variation of the thickness of the sample in the paper making direction. The measured values thus obtained are subjected to fast Fourier transformation (FFT) with an FFT analyzer Model CF-300 (mfd. by Ono Sokki K.K.) (input signal: AC ±10 mV, sampling: 512 units) under the following treatment conditions: a hunning window is used as time window and the frequency range is adjusted to 50 Hz. Power spectrum (unit: $(mV)^2$) on a linear scale is determined on the basis of arithmetic mean of 128 times of integration, and the squares of power values on a linear scale in a frequency range of 2 Hz to 25 Hz are summed up. The sum is multiplied by ⅔ and the square root of the product is calculated. Thus, the film thickness nonuniformity index Rpy can be determined. As to other frequency analysis conditions, the analysis is carried out under the initial preset conditions of Model CF-300.

It was found that the object of the present invention is synergistically achieved by using base paper having a film thickness nonuniformity index Rpy in the paper making direction defined in the present description of 140 mV or less, and a resin composition composed mainly of a specific polyethylene type compound resin, as a resin for coating. In particular, the cuttability of a resin-coated paper type support for image-forming material is synergistically improved by the present invention, so that the support for image-forming material according to the present invention or an image-forming material having the support shows a very good cut surface. In addition, it was found that the object of the present invention is markedly achieved by the use of base paper having a film thickness nonuniformity index Rpy in the paper making direction defined in the present description of 135 mV or less. Furthermore, it was found that the object of the present invention is markedly achieved by using in the polyethylene type compound resin a low-density polyethylene resin or a medium-density polyethylene resin, which has a melt flow rate of less than 1 g/10 min and not less than 0.2 g/10 min. Thus, the present invention has been achieved.

The base paper composed mainly of natural paper which is used in the present invention has a film thickness nonuniformity index Rpy in the paper making direction defined in the present description (the term "film thickness nonuniformity index Rpy in the paper making direction" is hereinafter abbreviated as "film thickness nonuniformity index Rpy") of 140 mV or less, preferably 135 mV, more preferably 130 mV or less. The investigation by the present inventors revealed that specifically, the base paper having a film thickness nonuniformity index Rpy of 140 mV or less can be obtained by employing the following methods singly, preferably in combination of two or more thereof, more preferably three or more thereof, most preferably four or more thereof.

(1) As the natural pulp used, hardwood pulp which is composed of short fiber and easily gives smoothness is used in a large portion. Specifically, for example, the hardwood pulp described in Japanese Patent Unexamined Publication No. 60-69649 is used in a proportion of 60% by weight or more, preferably 70% by weight or more.

(2) As to conditions of beating of the pulp, the pulp was beaten with a beater so as to be reduced in long fiber as much as possible. Specifically, for example, the pulp is beaten as follows: the length weighted average fiber length measured according to JAPAN TAPPI Paper Pulp Test Method No. 52-89 "Test Methods of Fiber Length of Paper and Pulp" is adjusted to 0.4 to 0.75 mm, preferably 0.45 to 0.7 mm, more preferably 0.45 to 0.65 mm, the weight percentage of fiber with a fiber length of 1 mm or less in cumulative distribution is adjusted to 70% or more, and the freeness is adjusted to 200 to 330 CSF.

(3) The base paper is made with a Fourdrinier paper machine so as to attain a uniform formation by application of a suitable paper making method to stuff slurry containing internal additives. Specifically, any of the following methods, for example, is employed. i) A suitable turbulence is given to the stuff slurry. ii) There is used a Fourdrinier paper machine having such a suitable upper dehydrating mechanism as is described in Japanese Patent Unexamined Publication No. 61-284762. iii) Multi-stage wet pressing, preferably 3-stage or higher-order multi-stage pressing is carried out as pressing in a wet part, and a smoothing roll is provided in the last stage of press part.

(4) Bulk density pressing is employed during drying of wet web. Specifically, the wet web is subjected to such multi-stage bulk density pressing as described in Japanese Patent Unexamined Publication No. 3-29945.

(5) The base paper is made and then calendered with a machine calender, super calender, hot calender or the like. Specifically, it is preferable to carry out, for example, the hot calendering described in Japanese Patent Unexamined Publication No. 60-126397.

As the pulp constituting the base paper, such properly chosen natural pulp as is described above is advantageously used, though if necessary, synthetic pulp and synthetic fiber may be used besides the natural pulp. As the natural pulp, there are used wood pulps such as softwood pulp, hardwood pulp and softwood-hardwood mixed pulp which have been subjected to, for example, usual bleaching treatment with chlorine, a hypochlorite or chlorine dioxide, alkali extraction, alkali treatment, and optionally oxidation bleaching with hydrogen peroxide, oxygen or the like, and a combination of these treatments. There can be used various pulps such as kraft pulp, sulfite pulp, soda pulp, etc.

As described above, a composition consisting of any of various water-soluble polymers or hydrophilic colloids or latices, an antistatic agent and additives can be incorporated into or applied on the base paper with a size press or a tab size press or by coating such as blade coating, air-knife coating or the like. It is advantageous to incorporate the following materials in proper combination: water-soluble polymers or hydrophilic colloids, such as the starch type polymers, poly(vinyl alcohol) type polymers, gelatin type polymers, polyacrylamide type polymers and cellulose type polymers, which are described in Japanese Patent Unexamined Publication No. 1-266537; emulsions and latices, such as petroleum resin latices, the emulsions or latices of copolymers obtained by using ethylene and acrylic acid (or methacrylic acid) at least as constituents which are described in Japanese Patent Unexamined Publication Nos. 55-4027 and 1-180538, and emulsions and latices of styrene-butadiene, styrene-acrylic, vinyl acetate-acrylic, ethylene-vinyl acetate, butadiene-methyl methacrylate copolymers and carboxy-modified copolymers obtained from them; antistatic agents such as alkali metal salts (e.g. sodium chloride and potassium chloride), alkaline earth metals (e.g. potassium chloride and barium chloride), colloidal metal oxides (e.g. colloidal silica), organic antistatic agents (e.g. polystyrenesulfonates), etc.; pigments such as clay, kaolin, calcium carbonate, talc, barium sulfate, titanium oxide, etc.; pH adjustors such as hydrochloric acid, phosphoric acid, citric acid, sodium hydroxide, etc.; and the above-exemplified additives such as the color pigments, color dyes and fluorescent whitening agents.

Although the thickness of the base paper is not particularly limited, its basis weight is preferably 20 to 200 $g/m^2$.

The side of the base paper of the support for image-forming material according to the present invention on which an image-forming layer is to be formed, is preferably coated with a resin having film-forming properties. As the resin having film-forming properties, thermoplastic resins such as polyolefin resins, polycarbonate resins, polyester resins, polyamide resins, etc. are preferable. Of these, from the viewpoint of the ease of melt extrusion coating, the polyolefin resins are more preferable, and polyethylene type resins are particularly preferable. As the polyethylene type resins, there can be used various polyethylene type resins, for example, low-density polyethylene resins, medium-density polyethylene resins, high-density polyethylene resins, linear low-density polyethylenes, copolymers of ethylene and an $\alpha$-olefin such as propylene or butylene, carboxy-modified polyethylene resins, and mixtures thereof. Polyethylene type resins various in their density, MFR, molecular weight and molecular weight distribution can be used, though usually, there can be advantageously used polyethylene type resins having a density in the range of 0.91–0.97 $g/cm^3$, an MFR of 1–30 g/10 min, and a molecular weight in the range of 20,000 to 250,000, singly or as a mixture thereof. The above-mentioned side may be coated with the electron-radiation-curable resin described in Japanese Patent Post-examined Publication No. 60-17104.

On the surface of the second resin layer of the resin-coated paper of the present invention can be formed, by coating, such an undercoating layer as is described in Japanese Patent Unexamined Publication Nos. 61-84643, 1-92740, 1-102551 and 1-166035, etc., after subjecting the second resin layer to an activating treatment such as corona discharge treatment, flame treatment, or the like. For preventing electrification, any of various back coating layers can be formed by coating on the first resin layer after subjecting the first resin layer to an activating treatment such as corona discharge treatment, flame treatment, or the like. Into the back coating layer may be incorporated in proper combination the inorganic antistatic agents, organic antistatic agents, hydrophilic binders, latices, curing agents, pigments, surfactants, etc., which are described, for example, in Japanese Patent Post-examined Publication Nos. 52-18020, 57-9059, 57-53940 and 58-56859, and Japanese Patent Unexamined Publication Nos. 59-214849 and 58-184144.

As a result of exhaustive study by the present inventors, it was found that the object of the present invention is particularly effectively achieved in the following manner: in a process for producing resin-coated paper by extrusion-coating one side of base paper with a polyethylene type resin, the polyethylene type resin is melt-extruded from an extruder at a resin pressure at the end of screw of the extruder which is higher than critical resin pressure (Pc).

The aforesaid critical resin pressure (Pc) is calculated by the following method:

$$Pc=(Z\cdot\eta\cdot CSR)/(9.8\times10^5\cdot H) \qquad (2)$$

wherein Z is the extend length of the screw:

$$Z=\pi\cdot n\cdot D/\cos\theta$$

[wherein

Pc: critical resin pressure at the end of the screw (Kgf/$cm^2$), $\eta$: the viscosity of the resin at 240° C. at a shear rate of ($\pi$ND)/(60H) (N is screw revolution rate), CSR: the critical shear rate of the resin (l/sec), H: screw channel depth in the lower part of a hopper (cm), n: the pitch of the screw, D: barrel bore (cm), $\theta$: the pitch angle of the screw (degree)].

The resin pressure at the end of screw of the extruder used in the present invention (the resin pressure before a breaker plate) can easily be measured with a commercial resin pressure meter provided in the extruder. In this case, a state in which the resin pressure becomes constant without revolution of the screw in the extruder filled with the resin is referred to as a state in which the resin pressure is zero.

When the above-mentioned resin pressure at the end of screw of the extruder is not higher than the critical resin pressure calculated by the above equation (2), the prevention of gel formation in the resin layer becomes insufficient. Therefore, it is not desirable.

As a method for increasing the resin pressure, there are exemplified a method of using a resin having as low a melt flow rate prescribed in JIS K 6760 (hereinafter referred to merely as MFR) as possible within the range specified in the present invention, a method of reducing the opening of a die lip, a method of reducing the aperture area of breaker plate in the extruder, a method of inserting screen packs into a flow channel for resin in the extruder, a method of increasing the number of screen packs, and a method of using screen packs of fine mesh. These method may be employed singly or in combination of two or more thereof.

In practice, for extending the operation range during extrusion melt coating, the critical resin pressure is preferably low. As a method for reducing the critical resin pressure, there are exemplified a method using resin having as low a viscosity or critical shear rate as possible within the range specified in the present invention, and a method of reducing the extend length of the screw. Such methods may be used singly or in combination of two or more thereof.

Further, in some cases, a gel is formed to cause a trouble when the extruder is operated at a reduced revolution rate owing to, for example, cleaning of the die lip or changeover of the resin. In this case, the gel formation can be prevented by adjusting the resin pressure to a pressure higher than the critical resin pressure by carrying out the present invention.

For extrusion-coating base paper with the polyethylene type resin melt-extruded through the die of the aforesaid extruder, the base paper may be extrusion-coated with the resin either directly or after subjecting the surface to be bonded of the base paper, previously to a conventional surface-activating treatment such as corona discharge treatment, flame treatment, anchor coat treatment or the like in order to improve the adhesion between the base paper and the polyethylene type resin.

The extrusion coating can be carried out using conventional method and apparatus. For example, it is carried out by extruding the polyethylene type resin into a molten thin film through the die of the extruder at a resin temperature of 280°–340° C., conducting the molten thin film to a pressure roll, and extrusion-coating the base paper conducted to the pressure roll without or after the above-mentioned surface-activating treatment, with the molten thin film through the pressure roll and a cooling roll.

Although the thickness of the aforesaid polyethylene type resin layer is not particularly limited, it is usually in the thickness range of approximately 5–50μ.

As the polyethylene type resin used as the resin layer, a high-density polyethylene and a low-density polyethylene or a medium-density polyethylene are used.

It can be speculated that the suppression of gel formation according to the present invention is due to the viscoelastic properties of the resin at a high resin temperature at the time of melt extrusion coating. It is conjectured that the suppression is achieved by virtue of the reduction of the chance of gelation, the grinding and kneading of a gel, etc., which are caused by adjusting the resin pressure at the end of the screw to a pressure higher than the critical resin pressure.

In addition, as a result of earnest research by the present inventors, it was found that the object of the present invention is particularly effectively achieved when the center plane average roughness SRa of the first resin layer in the lengthwise direction (machine direction) at a cut-off value of 0.8 mm which is measured by means of a feeler type three-dimensional surface roughness meter is in the range of 0.6 to 2.0 μm.

The term “center plane average roughness SRa at a cut-off value of 0.8 mm which is measured by means of a feeler type three-dimensional surface roughness meter” used in the present description is defined by the following equation:

$$SRa = \frac{1}{Sa} \int_{O}^{Wx} \int_{O}^{Wy} |f(X,Y)| dX, dY$$

In the above equation, Wx is the length in the X-axis direction (paper making direction) of a sample surface region, Wy is the length in the Y-axis direction (direction perpendicular to paper making direction) of the sample surface region, and Sa is the area of the sample surface region.

Specifically, the center plane average roughness SRa can be measured using a meter Model SE-3AK and an analyzer Model SPA-11 (mfd. by Kosaka Kenkyusho K.K.) as a feeler type three-dimensional surface roughness meter and a three-dimensional roughness analyzer, respectively, under the following conditions: cut-off value 0.8 mm, Wx=20 mm, Wy=8 mm, hence Sa=160 $mm^2$. For data processing in the X-direction, 500 units are sampled, and scanning in the X-axis direction is carried out in 17 lines or more.

It was found that the object of the present invention is synergistically achieved by processing the first resin layer of the resin-coated paper so as to adjust its center plane average roughness SRa to a value in the range of 0.6 to 2.0 μm, and using a resin composition composed mainly of a specific polyethylene type compound resin, as a resin for the first resin layer. In particular, cooling roll stains formed during the production of the resin-coated paper type support for image-forming material are synergistically reduced by the present invention, so that the support for image-forming material according to the present invention or an image-forming material having the support is free from quality problems caused by the transfer of the cooling roll stains. In addition, it was found that the object of the present invention is markedly achieved by processing the surface of the resin layer on the reverse side so as to adjust the center plane average roughness SRa defined in the present description to a value in the range of 0.8 to 1.6 μm. Furthermore, it was found that the object of the present invention is markedly achieved by using in the polyethylene type compound resin a low-density polyethylene resin or a medium-density polyethylene resin, which has a melt flow rate of less than 1 g/10 min and not less than 0.2 g/10 min.

As described above, the first resin layer of the resin-coated paper is preferably processed so as to have a center plane average roughness SRa in the range of 0.6 to 2.0 μm. When the center plane average roughness SRa is less than 0.6 μm, sufficient prevention of the formation of cooling roll stains becomes difficult. Moreover, when the support for image-forming material or an image-forming material having the support is wound up in the form of a roll after having been produced, the obverse and reverse sides tend to adhere to each other, namely, they tend to undergo blocking. Therefore, it is not desirable. On the other hand, when the center plane average roughness SRa is more than 2.0 μm, the prevention of the formation of cooling roll stains becomes insufficient. Moreover, when the support for image-forming material or an image-forming material having the support is wound up in the form of a roll, the surface thereof tends to be tarnished. Therefore, it is not desirable. The center plane average roughness SRa of surface of the reverse resin layer of the support for image-forming material according to the present invention is preferably 0.8 to 1.6 μm.

To process the surface of the first resin layer so as to adjust its center plane average roughness SRa to a value in the range of 0.6 to 2.0 μm, it is sufficient that there is used a cooling roll having a surface roughness capable of giving an SRa value in the above range. As to a concrete method for producing the cooling roll, the cooling roll can be produced, for example, by the embossing method, etching method, dry sandblasting method, liquid honing method, etc., which are described in Japanese Patent Unexamined Publication Nos. 60-6944 and 62-150247. The liquid honing method is preferable. It is preferable that before use of the cooling roll, the resin-coated paper is previously produced using the cooling roll, after which the center plane average roughness SRa of the reverse side of the resin-coated paper is measured and confirmed.

As described above, a composition consisting of any of various water-soluble polymers or hydrophilic colloids or latices, an antistatic agent and additives can be incorporated into or applied on the basis paper with a size press or a tab size press, or by coating such as blade coating, air-knife coating or the like. It is advantageous to incorporate the following materials in proper combination: water-soluble polymers or hydrophilic colloids, such as the starch type polymers, poly(vinyl alcohol) type polymers, gelatin type polymers, polyacrylamide type polymers and cellulose type polymers, which are described in Japanese Patent Unexamined Publication No. 1-266537; emulsions and latices, such as petroleum resin latices, the emulsions or latices of copolymers obtained by using ethylene and acrylic acid (or methacrylic acid) at least as constituents which are described in Japanese Patent Unexamined Publication No. 1-180538, and emulsions and latices of styrene-butadiene, styrene-acrylic, vinyl acetate-acrylic, ethylene-vinyl acetate, butadiene-methyl methacrylate copolymers and carboxy-modified copolymers obtained from them; antistatic agents such as alkali metal salts (e.g. sodium chloride and potassium chloride), alkaline earth metals (e.g. calcium chloride and barium chloride), colloidal metal oxides (e.g. colloidal silica), organic antistatic agents (e.g. polystyrene sulfonates), etc.; pigments such as clay, kaolin, calcium carbonate, talc, barium sulfate, titanium oxide, etc.; pH adjustors such as phosphoric acid, citric acid, sodium hydroxide, etc.; and the above-exemplified additives such as the color pigments, color dyes and fluorescent whitening agents.

As the basis paper, there is preferably used basis paper which has a smooth surface with a Bekk smoothness (prescribed in JIS P 8119) of 100 seconds or more, more preferably 200 seconds or more. For producing base paper having a Bekk smoothness of 100 seconds or more, there is usually used, in a large proportion, hardwood pulp which is composed of short fiber and easily gives smoothness, and the hardwood pulp is beaten with a beater so as to be decreased in longer fiber as much as possible. Specifically, it is preferable to beat the pull so as to adjust the fiber length and freeness of the pulp after the beating to a 42-mesh residue of 20 to 45%, and 200 to 350 CSF, respectively. Then, a stuff slurry containing internal additives is made into paper so as to give uniform formation, with a conventional paper machine such as a Fourdrinier paper machine, cylinder paper machine or the like by such a suitable paper making method as is described in Japanese Patent Unexamined Publication Nos. 58-37642, 61-260240, 61-284762, etc. After the paper making, the paper is calendered with a machine calender, super calender, hot calender or the like. Thus, the base paper having a Bekk smoothness of 100 seconds or more can be produced. Although the thickness of the base paper used for carrying out the present invention is not particularly limited, its basis weight is preferably 20–250 $g/m^2$.

The present invention is more concretely explained below with reference to examples, but the present invention is not limited by the examples within the scope of the gist of the invention.

EXAMPLE 1

70 Parts by weight of an HDPE having an MFR of 15.0 g/10 min, a density of 0.967 $g/cm^3$ and a critical shear rate of 60 (l/sec) (A in Table 1 given hereinafter) and 30 parts by weight of an LDPE having an MFR of 0.6 g/10 min, a density of 0.924 $g/cm^3$, a percentage of molecules with a molecular weight of 500,000 of 15% by weight or more, and a critical shear rate of 0.06 (l/sec) (e in Table 1) were previously melt-blended and then extruded onto paper having a high smoothness and a basis weight of 170 $g/m^2$, to a thickness of 25 $\mu$m from an extruder at a resin temperature of 320° C. to coat the paper, whereby the production was carried out.

As to a method for evaluating the molding processability during the melt extrusion coating of the resins, the degree of neck-in was estimated by measuring the length in crosswise direction of a resin-coated portion, and there was synthetically evaluated the molding processability including the degree of formation of streaks in a molten resin film; the occurrence of film breakage which depends on the degree of draw down; flow unstability due to surge or draw resonance; and the like.

The rating is as follows; ○: good, Δ: slightly inferior but acceptable in practice, x: poor and not acceptable in practice.

As to a method for evaluating the adhesion between base paper and resin layer of the resin-coated paper, a sample was separated into its base paper layer and resin layer by peeling, and the area percentage of a base paper layer portion adhering to the peeled resin layer was measured, whereby the adhesion between the base paper and the resin layer was evaluated. The rating is as follows; ○: good (area percentage: 100%), Δ: slightly inferior adhesion but acceptable in practice (area percentage: less than 100% and not less than 80%), x: poor adhesion and not acceptable in practice (area percentage: less than 80%).

A method for estimating a gel formed during the melt extrusion of the resins was as follows: after the resins were extruded into a film for 8 hours under conditions of a preset temperature of 320° C. and an extrusion rate of 2.5 kg/hr, pieces of the gel of 0.1 mm or more in 0.01 $m^2$ of the film were counted and their number was compared with the initial number, whereby the gel was estimated. The rating is as follows; ○: the number of pieces of the gel after 8 hours was the same as the initial number, x: the number of pieces of the gel after 8 hours was larger than the initial number.

As to a method for evaluating the fabrication properties of the resin-coated paper, there were synthetically evaluated fabrication properties including cuttability evaluated from the degree of fluffing of the cut surface of a sample formed by cutting the sample with a commercial guillotine cutter; abrasion resistance evaluated from the degree of scratches on the surface of the resin layer which were made by placing the resin layer surfaces of two sheets of the resin-coated paper one upon another and rubbing them together; the nerve of the resin-coated paper; and the like. The rating is as follows; ○: good, Δ: slightly inferior but acceptable in practice, x: poor and not acceptable in practice.

Table 1 shows physical properties of the HDPE and the LDPE which were used in the present example, and Table 2 shows evaluation results obtained for the obtained resin-coated paper by the above evaluation methods.

EXAMPLES 2 TO 9

Resin-coated papers were obtained in the same manner as in Example 1 except that in place of the combination of the HDPE and the LDPE used in Example 1, there was used each of various resin compositions composed of a combination of the HDPE and the LDPE which are shown in Table 1. Table 2 shows evaluation results obtained for the resin-coated papers by the above evaluation methods.

EXAMPLES 10 TO 18

In Examples 10 to 17, resin-coated papers were obtained in the same manner as in Example 1 except that in place of the combination of the HDPE and the LDPE used in Example 1, there was used each of various resin compositions composed of a combination of the HDPE and the LDPE which are shown in Table 1. Table 3 shows evaluation results obtained for the resin-coated papers by the above evaluation methods.

In Example 18, resin-coated paper was obtained in the same manner as in Example 1 except for using a composition composed of HDPE and LDPE of the same kinds in the same proportions as in Example 1, after dry blending without melt blending. Table 3 shows evaluation results obtained for the resin-coated paper by the above evaluation methods.

Each of the resin-coated papers obtained in Examples 1 to 9 was immersed in a commercial aqueous hypochlorous acid solution for 3 days to be separated into the resin layer and the base paper. The resin layer separated was washed with water and air-dried, after which the MFR, density and critical shear rate were measured by the methods described above. Consequently, it was found that for the resin layers of all the resin-coated papers, the MFR was 1.0–40 g/10 min, the density 0.930–0.971 g/cm$^3$ and the critical shear rate 20 (1 sec) or less.

TABLE 1

| Resin | Kind | MRF g/min | Density g/cm$^3$ | Percentage of molecules with a molecular weight of 500,000 or more % by weight | Critical shear rate l/sec |
|---|---|---|---|---|---|
| High-density polyethylene (HDPE) | A | 15 | 0.967 | — | 60 |
| | B | 20 | 0.967 | — | 70 |
| | C | 7 | 0.967 | — | 27 |
| | D | 20 | 0.960 | — | 70 |
| | E | 30 | 0.960 | — | 80 or more |
| Low-density polyethylene (LDPE) | e | 0.6 | 0.924 | 15.0 | 0.06 |
| | f | 0.9 | 0.924 | 13.9 | 0.20 |
| | g | 1.2 | 0.918 | 15.6 | 0.53 |
| | h | 3.5 | 0.926 | 9.1 | 1.6 |
| | i | 0.8 | 0.923 | 4.1 | 1.5 |
| | j | 0.4 | 0.923 | 9.2 | 0.32 |

TABLE 2

| Example | HDPE Kind | HDPE Percentage (%) | LDPE Kind | LDPE Percentage (%) | Critical shear rate l/sec | Molding process-ability | Adhesion | Gel | Fabrication properties |
|---|---|---|---|---|---|---|---|---|---|
| 1 | A | 70 | e | 30 | 2.3 | ○ | ○ | ○ | ○ |
| 2 | A | 75 | e | 25 | 3.1 | ○ | ○ | ○ | ○ |
| 3 | A | 80 | e | 20 | 4.4 | ○ | ○ | ○ | ○ |
| 4 | B | 65 | e | 35 | 1.7 | ○ | ○ | ○ | ○ |
| 5 | B | 70 | e | 30 | 2.8 | ○ | ○ | ○ | ○ |
| 6 | B | 75 | e | 25 | 3.7 | ○ | ○ | ○ | ○ |
| 7 | B | 80 | e | 20 | 6.3 | ○ | ○ | ○ | ○ |
| 8 | A | 80 | f | 20 | 7.0 | ○ | ○ | ○ | ○ |
| 9 | E | 65 | e | 35 | 2.4 | ○ | ○ | ○ | ○ |

TABLE 3

| Example | HDPE Kind | HDPE Percentage (%) | LDPE Kind | LDPE Percentage (%) | Critical shear rate l/sec | Molding process-ability | Adhesion | Gel | Fabrication properties |
|---|---|---|---|---|---|---|---|---|---|
| 10 | A | 95 | e | 5 | 30.0 | x | x | x | ○ |
| 11 | C | 95 | e | 5 | 15.0 | x | x | x | ○ |
| 12 | A | 50 | e | 50 | 1.0 | ○ | ○ | ○ | x |
| 13 | D | 80 | g | 20 | 17.0 | ○ | ○ | x | ○ |
| 14 | A | 80 | h | 20 | 17.0 | x | ○ | x | ○ |
| 15 | D | 80 | h | 20 | 20.0 | x | ○ | x | ○ |
| 16 | A | 80 | i | 20 | 20.0 | x | ○ | x | ○ |
| 17 | A | 80 | j | 20 | 9.0 | x | ○ | ○ | ○ |
| 18 | A | 70 | e | 30 | — | x | Δ | x | x |

From the results shown in Table 2, it can be seen that the resin-coated papers having a resin layer made of a composition which is composed of a blend of 90 to 65 parts by weight of HDPE and 10 to 35 parts by weight of LDPE (the HDPE and the LDPE have physical properties specified in the present invention) and has a critical shear rate of 10 (l/sec) or less (Examples 1 to 9) are so excellent in quality that they have good molding processability and adhesion and contain only a small amount of gel.

On the other hand, the results shown in Table 3 indicate the following: when the requisites of the present invention are not satisfied, for example, when the content of HDPE is more than 90 parts by weight (Examples 10 and 11), the molding processability and the adhesion are not good and a large amount of gel is contained. When the content of HDPE is less than 65 parts by weight (Example 12), the secondary molding processability is poor. When the critical shear rate of LDPE is more than 0.5 (l/sec) (Examples 13 to 16), a large amount of gel is contained. When the percentage of molecules with a molecular weight of 500,000 or more is less than 10% by weight (Examples 14 to 17), the molding processability is poor.

In addition, when the critical shear rate of the resin composition of HDPE with LDPE is more than 10.0 (l/sec) (Examples 10, 11 and 13 to 16), a large amount of gel is contained. When the composition of HDPE with LDPE is dry blended as it is without melt blending (Example 18), the molding processability is poor, so that no desirable result can be obtained.

According to the present invention, there is provided polyethylene-type-resin-coated paper which is good in molding processability of its resin layer, is excellent in the adhesion between the resin layer and base paper, and contains only a small amount of gel.

EXAMPLE 19

Mixed pulp of bleached sulfite hardwood pulp and bleached kraft hardwood pulp in the ratio of 1:1 was beaten to adjust its Canadian standard freeness to 320 ml. Then, to 100 parts by weight of the pulp were added 3 parts by weight of cationized starch, 0.2 part by weight of an anionized polyacrylamide, 0.4 part by weight of an alkylketene dimer emulsion (in terms of the ketene dimer) and 0.4 part by weight of a polyamino polyamide epichlorohydrin resin, and paper having a basis weight of 160 $g/m^2$ was made from them. The wet web thus obtained was dried at 110° C., subsequently impregnated with an impregnating solution consisting of 3 parts by weight of a carboxy-modified poly(vinyl alcohol), 0.05 part by weight of a fluorescent whitening agent, 0.002 part by weight of a blue dye, 4 parts by weight of sodium chloride, 0.2 part by weight of citric acid and 93 parts by weight of water, in an amount of 25 $g/m^2$, dried in hot air at 110° C., and then super-calendered at a linear pressure of 90 kg/cm to produce base paper for photographic support. The Bekk smoothness of the base paper in this case was 200 seconds.

Next, the side (the reverse side) of the base paper which was reverse to the side on which an image-forming layer was to be formed by coating was subjected to corona discharge treatment and then melt extrusion coating with each polyethylene resin composition listed in Table 4 in the resin coating weight described in Table 4 at a resin temperature of 320° C. and a running rate of the base paper of 150 m/min to form a first resin layer.

Subsequently, the obverse side of the base paper was subjected to corona discharge treatment and then melt extrusion coating with a resin composition consisting of 20 parts by weight of a titanium dioxide pigment master batch consisting of 47.5% by weight of a low-density polyethylene resin (density 0.920 $g/cm^3$, MFR=8.5 g/10 min), 50% by weight of an anatase type titanium dioxide pigment surface-treated with hydrated aluminum oxide (0.75% by weight in terms of $Al_2O_3$ relative to the weight of titanium dioxide) and 2.5% by weight of zinc stearate, 65 parts by weight of a low-density polyethylene resin (density 0.920 $g/cm^3$, MFR=4.5 g/10 min), and 15 parts by weight of a high-density polyethylene resin (density 0.970 $g/cm^3$, MFR=7.0 g/10 min), in each resin coating weight described in Table 4 at a resin temperature of 320° C. and a running rate of the base paper of 150 m/min to form a second resin layer. The melt extrusion coatings with polyethylene resin on the obverse side and reverse side were carried out a so-called tandem method in which the extrusion coatings were carried out one after another. In this case, the surface of the second resin layer containing the titanium dioxide pigment of the resin-coated paper was processed into a glossy surface and the surface of the first resin layer was processed into a mat surface like a paper surface.

Then, the surface of the first resin layer of the resin-coated paper was subjected to corona discharge treatment and then on-machine coating with the following back coating fluid. The back coating fluid consisting of colloidal silica and a styrene-based copolymer latex in the ratio of 1:1 based on dry basis and further containing 0.021 $g/m^2$ of a sodium polystyrenesulfonate and suitable amounts of a coating aid and the like was applied in an amount of 0.21 $g/m^2$ in terms of the latex (weighed in terms of solids) to obtain a support for image-forming material.

As to methods for evaluating the molding processability of the polyethylene resin compositions for the first and the second resin layers, respectively, in the production of the support for image-forming material in the manner described above, the degree of the formation of a gelatinous foreign matter, and the performance characteristics of the obtained sample as support for image-forming material, the evaluations were carried out by the methods described below.

As to a method for evaluating the molding processability of the polyethylene resin composition for the first resin layer in the production of the support for image-forming material, the degree of neck-in was estimated by measuring the length in crosswise direction of a resin-coated portion on the reverse side, and there was synthetically evaluated the molding processability including the degree of formation of streaks in a molten resin film; the occurrence of film breakage which depends on the degree of draw down; flow unstability due to surge or draw resonance; and the like. The rating is as follows; ○: good, Δ: slightly inferior but acceptable in practice, x: poor and not acceptable in practice.

A method for estimating a gelatinous foreign matter formed during the melt extrusion of the polyethylene resin composition for the first resin layer was as follows: after the composition was extruded into a film for 8 hours under conditions of a preset temperature of 320° C. and an extrusion rate of 2.5 kg/hr, pieces of the gelatinous foreign matter of 0.1 mm or more in 0.01 $m^2$ of the film were counted and their number was compared with the initial number, whereby the gelatinous foreign matter was estimated. The rating is as follows: ○: the number of pieces of the gelatinous foreign matter after 8 hours was the same as the initial number, Δ: the number of pieces of the gelatinous foreign matter after 8 hours is a little larger than the initial number but acceptable in practice, x: the number of pieces of the gelatinous foreign matter after 8 hours was much larger than the initial number and not acceptable in practice.

As to a method for evaluating the adhesion between base paper and resin layer of the support for image-forming material, each sample was stored in a thermo-hygrostat at 50° C. and 60% RH for 24 hours and then separated into the base paper layer and the resin layer of the sample by peeling, and the area percentage of a base paper layer portion adhering to the peeled resin layer was measured, whereby the adhesion between the base paper and the first resin layer was evaluated. The rating is as follows; ○: good (area percentage: 100%), Δ: slightly inferior adhesion but acceptable in practice (area percentage: less than 100% and not less than 80%), x: poor adhesion and not acceptable in practice (area percentage: less than 80%).

As to a method for evaluating the curling properties of the support for image-forming material, the evaluation was carried out as follows. First, after having been subjected to corona discharge treatment, the surface of the second resin layer containing the titanium dioxide pigment of the support for image-forming material was provided with a blue-sensitive emulsion layer containing a yellow coupler, an intermediate layer containing a colors-mingling inhibitor, a green-sensitive emulsion layer containing a magenta coupler, an ultraviolet-absorbing layer containing an ultraviolet absorber, a red-sensitive emulsion layer containing a cyan coupler, and a protective layer, whereby color print paper containing gelatin in a total amount of 8 $g/m^2$ was produced. Each color-sensitive emulsion layer contained silver chlorobromide in an amount corresponding to 0.6 $g/m^2$ of silver nitrate and further contained gelatin necessary for the production, dispersion and film formation of silver halide, suitable amounts of an antifogging agent, sensitizing dyes, a coating aid, a hardening agent and a thickner, a suitable amount of a filter dye, and the like. Subsequently, the color print paper produced was stored at 35° C. and at ordinary humidity for 5 days and then developed with color development, after which the state of curling of the resulting color print having dimen- sions of 8.2 cm×11.7 cm was estimated. The rating is as follows; ○: satisfactory curling properties, namely, somewhat minus curling (curling to the back coating layer) or flat, Δ: acceptable in practice though curling occurred to some degree x: not acceptable in practice, namely, serious curling occurred.

As to a method for evaluating the cuttability of the support for image-forming material, the aforesaid color print paper was cut to a length in the lengthwise direction of 11.7 cm with a precision print cutter and the state of the cut surface was evaluated. The rating is as follows; ○: good cuttability, namely, almost no whiskery projections were formed, Δ: acceptable in practice though a small number of whiskery projections were formed, x: poor cuttability and not acceptable in practice, namely, a large number of whiskery projections were formed.

As to a method for evaluating the smoothness of the support for image-forming material, the surface of the aforesaid color print paper was observed by light casted thereon at an angle and the visible glossiness was visually evaluated to pass judgement. The rating is as follows; ○: good smoothness of the support, i.e., high visible glossiness, Δ: slightly inferior smoothness of the support, i.e., somewhat low visible glossiness, but acceptable in practice x: poor smoothness of the support, i.e., low visible glossiness, and not acceptable in practice.

The results obtained are shown in Table 4.

TABLE 4

| Sample No. | Make-up of polyethylene resin composition for first resin layer (parts by weight) HDPE (Note 1) | LDPE (Note 2) | Method for preparing polyethylene resin composition first resin layer (Note 3) | Critical shear rate of polyethylene resin composition for first regin layer (l/sec) | Coating weight ($g/m^2$) Second resin layer | First resin layer | Difference in coating weight between first and second resin layers ($g/m^2$) |
|---|---|---|---|---|---|---|---|
| 1 | 95 | 5 | Compound | 30 | 32 | 25 | 7 |
| 2 | 90 | 10 | " | 10 | 32 | 25 | 7 |
| 3 | 80 | 20 | " | 4.4 | 32 | 25 | 7 |
| 4 | 70 | 30 | " | 2.8 | 32 | 25 | 7 |
| 5 | 70 | 30 | " | 2.8 | 31 | 26 | 5 |
| 6 | 70 | 30 | " | 2.8 | 30 | 27 | 3 |
| 7 | 70 | 30 | " | 2.8 | 28.5 | 28.5 | 0 |
| 8 | 70 | 30 | " | 2.8 | 27 | 30 | −3 |
| 9 | 70 | 30 | " | 2.8 | 25 | 32 | −7 |
| 10 | 70 | 30 | Simple blending | — | 32 | 25 | 7 |
| 11 | 65 | 35 | Compound | 2.2 | 32 | 25 | 7 |
| 12 | 50 | 50 | " | 1.0 | 32 | 25 | 7 |

| Sample No. | Molding processability of polyethylene resin composition for first resin layers | Degree of formation of gelatinous foreign matter | Adhesion between base paper and first resin layer | Curling properties | Cuttability | Smoothness |
|---|---|---|---|---|---|---|
| 1 | x | x | x | ○ | x | ○ |
| 2 | Δ | Δ | Δ | ○ | Δ | ○ |
| 3 | ○ | ○ | ○ | ○ | ○ | ○ |
| 4 | ○ | ○ | ○ | ○ | ○ | ○ |
| 5 | ○ | ○ | ○ | ○ | Δ | ○ |
| 6 | ○ | ○ | ○ | ○ | Δ | Δ |

TABLE 4-continued

| | | | | | | |
|---|---|---|---|---|---|---|
| 7 | ○ | ○ | ○ | ○ | Δ | x |
| 8 | ○ | ○ | ○ | Δ | x | x |
| 9 | ○ | ○ | ○ | x | x | x |
| 10 | x | (x) | ○ | ○ | x | ○ |
| 11 | ○ | ○ | ○ | Δ | ○ | ○ |
| 12 | ○ | ○ | ○ | x | Δ | ○ |

(x): A gelatinous foreign matter was formed from the early stage.

(Note 1) to (Note 3) in Table 1 are as follows:

(Note 1) HDPE: a high-density polyethylene resin having a density of 0.967 g/cm$^3$ and an MFR of 15 g/10 min.

(Note 2) LDPE: a low-density polyethylene resin having a density of 0.924 g/cm$^3$, an MFR of 0.6 g/10 min, a percentage of molecules with a molecular weight of 500,000 or more of 15% by weight and a critical shear rate of 0.06 (l/sec).

(Note 3) Preparation method of a polyethylene resin composition~Compound; the HDPE and the LDPE were used in the form of pellets of a compound resin prepared by previous melt blending by means of an extruder for kneading. Simple blending: the HDPE and the LDPE were used by charging them into a melt extruder in the form of a mixture obtained by simple blending.

From the results shown in Table 4, it can be well seen that the supports for image-forming material (samples No. 2, No. 3, No. 4, No. 5, No. 6 and No. 11) in which the difference in resin coating weight between the first and second resin layers is 3 g/m$^2$ or more and the polyethylene resin in the reverse resin layer is a compound resin prepared by previously melt-blending 90 parts by weight to 65 parts by weight of the high-density polyethylene resin and 10 parts by weight to 35 parts by weight of the low-density polyethylene resin according to the present invention, are excellent supports for image-forming material which are good in the molding processability of the polyethylene resin composition, do not contain a gelatinous foreign matter formed, and are satisfactory in the adhesion between the base paper and the resin layer, curling properties, cuttability and smoothness. In particular, it can be well seen that for the synthetic performance characteristics of the support for image-forming material, the difference in resin coating weight between the first and second resin layers and the content of HDPE are preferably more than 3 g/m$^2$ and 85 parts by weight to 70 parts by weight, respectively.

On the other hand, when the content of the high-density polyethylene resin is more than 90 parts by weight (sample No. 1), the molding processability of the polyethylene resin composition is poor, a large amount of a gelatinous foreign matter is formed, and the adhesion between the base paper and the resin layer is not good. Therefore, it is not desirable. When the content of the high-density polyethylene resin is less than 65 parts by weight (sample No. 12), the curling properties are not satisfactory. Therefore, it is not desirable. When simple blending is employed as a method for preparing the polyethylene resin composition (No. 10), the molding processability and cuttability of the polyethylene resin composition are not good and a large amount of a gelatinous foreign matter is formed from the early stage. Therefore, it is not desirable. In addition, when the difference in resin coating weight between the first and second resin layers is less than 3 g/m$^2$ (samples No. 7, No. 8 and No. 9), the cuttability and smoothness are not good. Therefore, it is not desirable.

EXAMPLE 20

An experiment was carried out in the same manner as in the case of No. 5 in Example 19 except that in place of the polyethylene resin composition for coating the reverse side which was used in No. 5 in Example 19, there was used each compound resin composition prepared in the same manner as in the case of No. 5 in Example 19 except for using the polyethylene resins described in Table 5 in the proportions described in Table 6.

The results obtained are shown in Table 6.

TABLE 5

| Resin | Kind | MRF (g/10 min) | Density (g/cm$^3$) | Percentage of molecules with a molecular weight of 500,000 or more (% by weight) | Critical shear rate l/sec |
|---|---|---|---|---|---|
| High-density polyethylene (HDPE) | A | 15 | 0.967 | — | 60 |
| | B | 20 | 0.967 | — | 70 |
| | C | 7 | 0.967 | — | 27 |
| | D | 20 | 0.960 | — | 70 |
| | E | 28 | 0.967 | — | 80 or more |
| | F | 38 | 0.967 | — | 80 or more |
| | G | 45 | 0.967 | — | 80 or more |
| Low-density polyethylene (LDPE) | h | 0.6 | 0.924 | 15.0 | 0.06 |
| | i | 0.9 | 0.924 | 13.9 | 0.20 |
| | j | 1.2 | 0.924 | 13.4 | 0.36 |
| | k | 1.2 | 0.918 | 15.6 | 0.53 |
| | l | 3.5 | 0.926 | 9.1 | 1.6 |
| | m | 0.8 | 0.923 | 4.1 | 1.5 |
| | n | 0.4 | 0.923 | 9.2 | 0.32 |

TABLE 6

| Sample No. | Make-up of polyethylene resin composition for first resin layer (parts by weight) HDPE Kind | HDPE Proportion (parts by weight | LDPE Kind | LDPE Proportion (parts by weight | Critical shear rate of polyethylene resin composition for first regin layer (l/sec) | Molding processability of polyethylene resin composition for first resin layers | Degree of formation of gelatinous foreign matter | Adhesion between base paper and first resin layer | Curling properties | Cuttability | Smoothness |
|---|---|---|---|---|---|---|---|---|---|---|---|
| 13 | A | 75 | h | 25 | 3.1 | ○ | ○ | ○ | ○ | ○ | ○ |
| 14 | A | 80 | h | 20 | 4.4 | ○ | ○ | ○ | ○ | ○ | ○ |
| 15 | B | 65 | h | 35 | 1.7 | ○ | ○ | ○ | Δ | ○ | ○ |
| 16 | B | 70 | h | 30 | 2.8 | ○ | ○ | ○ | ○ | ○ | ○ |
| 17 | B | 75 | h | 25 | 3.7 | ○ | ○ | ○ | ○ | ○ | ○ |
| 18 | B | 80 | h | 20 | 6.3 | ○ | ○ | ○ | ○ | ○ | ○ |
| 19 | D | 80 | h | 20 | 6.7 | ○ | ○ | ○ | Δ | ○ | ○ |
| 20 | A | 80 | i | 20 | 7.0 | ○ | ○ | ○ | ○ | ○ | o |
| 21 | A | 80 | j | 20 | 8.0 | ○ | Δ | ○ | ○ | ○ | ○ |
| 22 | E | 80 | h | 20 | 7.3 | ○ | ○ | ○ | ○ | ○ | ○ |
| 23 | F | 80 | h | 20 | 8.2 | Δ | Δ | Δ | ○ | ○ | ○ |
| 24 | D | 80 | k | 20 | 17 | ○ | x | ○ | Δ | ○ | ○ |
| 25 | A | 80 | l | 20 | 17 | x | x | ○ | ○ | ○ | ○ |
| 26 | D | 80 | l | 20 | 20 | x | x | Δ | Δ | ○ | ○ |
| 27 | A | 80 | m | 20 | 20 | x | x | ○ | ○ | ○ | ○ |
| 28 | A | 80 | n | 20 | 9.0 | x | Δ | ○ | ○ | ○ | ○ |
| 29 | C | 80 | h | 20 | 7.5 | ○ | ○ | ○ | ○ | x | ○ |
| 30 | G | 80 | h | 20 | 10.4 | x | x | x | ○ | ○ | ○ |

From the results shown in Table 6, it can be well seen that the supports for image-forming material according to the present invention (samples No. 13 to No. 23) in which the polyethylene resin in the first resin layer is a compound resin composition prepared by previously melt-blending 90 parts by weight to 65 parts by weight of a high-density polyethylene resin having an MFR of 10 g/10 min to 40 g/10 min and a density of 0.960 g/$cm^3$ or more and 10 parts by weight to 35 parts by weight of a low-density polyethylene resin having an MFR of 0.2 g/10 min to 2 g/10 min and a density of 0.935 g/$cm^3$ or less, a percentage of molecules with a molecular weight of 500,000 or more of 10% by weight or more and a critical shear rate of 0.5 (l/sec) or less, and the critical shear rate of the composition is 10 (l/sec) or less, are excellent supports for image-forming material which are good in the molding processability of the polyethylene resin composition, do not contain a gelatinous foreign matter formed, and are satisfactory in the adhesion between the base paper and the resin layer, curling properties, cuttability and smoothness.

In particular, it can be well seen that for preventing the formation of a gelatinous foreign matter, the low-density polyethylene resin is preferably one which have an MFR of less than 1 g/10 min (comparison of samples No. 14 and No. 20 with sample No. 21). The following can be also well seen: from the viewpoint of the curling properties, the high-density polyethylene resin used in the present invention is preferably one which has a density of 0.962 g/$cm^3$ or more (comparison of samples No. 14 and No. 18 with sample No. 19), and from the viewpoint of the molding processability, the preventive effect on a gelatinous foreign matter, and the adhesion between the base paper and the resin layer, the high-density polyethylene resin is preferably one which has an MFR in the range of 10 g/10 min to 30 g/10 min (comparison of samples No. 14, No. 18 and No. 22 with sample No. 23). In addition, it can be well seen that the compound resin composition used for carrying out the present invention is preferably one which has a critical shear rate of less than 8 (l/sec) (comparison of samples No. 13 to No. 20 and No. 22 with samples No. 21 and No. 23).

On the other hand, when the MFR of the low-density polyethylene resin is more than 2 g/10 min (sample No. 26), the molding processability and the degree of the formation of a gelatinous foreign matter are not satisfactory. Therefore, it is not desirable. When the percentage of molecules with a molecular weight of 500,000 or more is less than 10% by weight (samples No. 12 to No. 28), the molding processability is disadvantageously poor, and a large amount of a gelatinous foreign matter tends to be formed. When the MFR of the high-density polyethylene resin is more than 40 g/10 min (sample No. 30), the molding processability, the degree of the formation of a gelatinous foreign matter, and the adhesion between the base paper and the resin layer are not satisfactory. Therefore, it is not desirable. When the critical shear rate of the compound resin composition is more than 10 (l/sec) (samples No. 24 to No. 27 and No. 30), a large amount of a gelatinous foreign matter is undesirably formed.

The present invention makes it possible to provide an excellent resin-coated paper type support for image-forming material which does not contain a gelatinous foreign matter formed in the resin layer on the side reverse to the side on which an image-forming layer is to be formed; is good in the adhesion between the resin layer and the base paper; is satisfactory in curling properties, cuttability and smoothness; and can be produced rapidly and stably.

EXAMPLE 21

70 Parts by weight of a high-density polyethylene having an MFR of 15.0 g/10 min and a density of 0.967 g/$cm^3$ and 30 parts by weight of a low-density polyethylene having an MFR of 0.6 g/10 min, a density of 0.924 g/$cm^3$, a percentage of molecules with a molecular weight of 500,000 or more of 15% by weight, and a critical shear rate of 0.06 (l/sec) were previously melt-blended and then extruded onto paper having a high smoothness and a basis weight of 170 g/$m^2$, to a thickness of 25 $\mu$m from an extruder at a resin temperature of 320° C. to coat the paper, whereby the production was carried out.

As to a method for evaluating the molding processability during the melt extrusion coating of the resins, the degree of neck-in was estimated by measuring the length in the crosswise direction of a resin-coated portion, and there was synthetically evaluated the molding processability including the degree of formation of streaks in a molten resin film; the occurrence of film breakage which depends on the degree of draw down; flow unstability due to surge or draw resonance; and the like. The rating is as follows; ○: good, Δ: slightly inferior but acceptable in practice, x: poor and not acceptable in practice.

As to a method for evaluating the adhesion between base paper and resin layer of the polyethylene-type-resin-coated paper, a sample was separated into its base paper layer and polyethylene layer by peeling, and the area percentage of a base paper layer portion adhering to the peeled polyethylene layer was measured, whereby the adhesion between the base paper and resin layer was evaluated. The rating is as follows; ○: good (area percentage: 100%), Δ: slightly inferior adhesion but acceptable in practice (area percentage: less than 100% and not less than 80%), x: poor adhesion and not acceptable in practice (area percentage: less than 80%).

A method for estimating a gel formed during the melt extrusion of the resins was as follows: after the resins were extruded into a film for 8 hours under conditions of a preset temperature of 320° C. and an extrusion rate of 2.5 kg/hr, pieces of the gel of 0.1 mm or more in 0.01 $m^2$ of the film were counted and their number was compared with the initial number, whereby the gel was estimated. The rating is as follows: ○: the number of pieces of the gel after 8 hours was the same as the initial number, x: the number of pieces of the gel after 8 hours was larger than the initial number.

As to a method for evaluating the fabrication properties of the polyethylene-type-resin-coated paper, there were synthetically evaluated fabrication properties including cuttability evaluated from the degree of fluffing of the cut surface of a sample formed by cutting the sample with a commercial guillotine cutter; abrasion resistance evaluated from the degree of scratches on the surface of the resin layer which were made by placing the resin layer surfaces of two sheets of the resin-coated paper one upon another and rubbing them together; the nerve of the resin-coated paper; and the like. The rating is as follows; ○: good, Δ: slightly inferior but acceptable in practice, x: poor and not acceptable in practice.

EXAMPLES 22 TO 31

An experiment was carried out in the same manner as in Example 21 except for changing the kinds of resins for the polyethylene resin composition to those described in Table 7.

The results obtained are shown in Table 8 and Table 9.

TABLE 7

| Resin | Kind | MRF g/10 min | Density g/cm$^3$ | Percentage of molecules with a molecular weight of 500,000 or more % by weight | Critical shear rate l/sec |
|---|---|---|---|---|---|
| High-density | A | 15 | 0.967 | — | 60 |
| polyethylene | B | 20 | 0.967 | — | 70 |
| (HDPE) | C | 20 | 0.960 | — | 70 |
| | D | 7 | 0.967 | — | 27 |
| Low-density | e | 0.6 | 0.924 | 15.0 | 0.06 |
| polyethylene | f | 1.2 | 0.918 | 15.6 | 0.53 |
| (LDPE) | g | 3.5 | 0.926 | 9.1 | 1.6 |

TABLE 8

| | HDPE | | LDPE | | Critical | Screw revolution | Screw critical revolution |
|---|---|---|---|---|---|---|---|
| Sample | Kind | Portion parts by weight | Kind | Portion parts by weight | shear rate l/sec | rate rpm | rate rpm |
| Example 22 | A | 70 | e | 30 | 2.3 | 30 | 8 |
| Example 23 | A | 70 | e | 30 | 2.3 | 60 | 8 |
| Example 24 | A | 80 | e | 20 | 4.4 | 60 | 16 |
| Example 25 | B | 70 | e | 30 | 2.8 | 30 | 10 |
| Example 26 | B | 70 | e | 30 | 2.8 | 60 | 10 |
| Example 27 | C | 80 | f | 20 | 17.0 | 85 | 62 |
| Example 28 | D | 65 | g | 35 | 5.2 | 30 | 19 |
| Example 29 | C | 80 | f | 20 | 17.0 | 30 | 62 |
| Example 30 | C | 80 | f | 20 | 17.0 | 60 | 62 |
| Example 31 | A | 97 | e | 3 | 40.0 | 60 | 145 |

TABLE 9

| Sample | Gel | Adhesion | Molding processability | Fabrication properties |
|---|---|---|---|---|
| Example 22 | ○ | ○ | ○ | ○ |
| Example 23 | ○ | ○ | ○ | ○ |
| Example 24 | ○ | ○ | ○ | ○ |
| Example 25 | ○ | ○ | ○ | ○ |
| Example 26 | ○ | ○ | ○ | ○ |
| Example 27 | ○ | ○ | ○ | ○ |
| Example 28 | ○ | ○ | ○ | x |
| Example 29 | x | ○ | ○ | ○ |
| Example 30 | x | ○ | ○ | ○ |
| Example 31 | x | x | x | ○ |

From the results shown in Table 8, it can be well seen that the polyethylene-type-resin-coated papers produced by coating under melt extrusion conditions where the screw revolution rate is more than the critical revolution rate (Examples 22 to 27) are excellent polyethylene-type-resin-coated papers which do not contain a gel formed and are good in molding processability and the adhesion between the resin layer and the base paper.

On the other hand, when the MFR of the high-density polyethylene is less than 10 g/10 min (Example 28), the fabrication properties are undesirably poor. When the screw revolution rate of the extruder is less than the critical revolution rate (Examples 29 to 31), gel is undesirably serious. When the content of the high-density polyethylene is more than 90 parts by weight (Example 31), gel, the adhesion between the base paper and the resin layer, and the molding processability are not satisfactory. Therefore, it is not desirable.

The present invention makes it possible to provide an excellent polyethylene-type-resin-coated paper which is good in the molding processability of its resin layer and the adhesion between the resin layer and base paper, and can prevent gel in the resin layer.

EXAMPLE 32

Mixed pulp consisting of 50% by weight of bleached kraft hardwood pulp, 35% by weight of bleached sulfite hardwood pulp and 15% by weight of bleached sulfite softwood pulp was beaten to adjust its fiber length to each value shown in Table 10. Then, to 100 parts by weight of the pulp were added 3 parts by weight of cationized starch, 0.2 part by weight of an anionized polyacrylamide, 0.4 part by weight of an alkylketene dimer emulsion (in terms of the ketene dimer), 0.4 part by weight of a polyamide epichlorohydrin resin, and suitable amounts of a fluorescent whitening agent, a blue dye and a red dye to prepare a stuff slurry. Thereafter, the stuff slurry was placed on a Foordrinier paper machine operated at a rate of 200 m/min and made into a web with a suitable turbulence, and the web was subjected to 3-stage wet pressing at a linear pressure controlled in the range of 15 to 100 kg/cm in a wet part, treated with a smoothing roll, subjected to 2-stage bulk density pressing at a linear pressure controlled in the range of 30 to 70 kg/cm in a subsequent dry part, and then dried. In the course of the drying, the web thus treated was subjected to size press coating with a size press coating fluid consisting of 4 parts by weight of a carboxy-modified poly(vinyl alcohol), 0.05 part by weight of a fluorescent whitening agent, 0.002 part by weight of a blue dye, 4 parts by weight of sodium chloride and 92 parts by weight of water, in an amount of 25 $g/m^2$, dried so as to adjust the water content of finally obtained base paper to 8% by weight in the bone-dry state, and subjected to machine calendering treatment under the condition shown in Table 10 and then hot soft calendering treatment under conditions of a temperature of 150° C. and a linear pressure of 150 kg/cm. Thus, there was obtained base paper for a support for image-forming material which had a basis weight of 170 $g/m^2$ and the film thickness nonuniformity index Rpy described in Table 10.

Next, the side (the reverse side) of the base paper which was reverse to the side on which an image-forming layer was to be formed by coating was subjected to corona discharge treatment and then melt extrusion coating with each of the following polyethylene resin compositions according to the combination described in Table 10 to a resin thickness of 26 $\mu m$ at a resin temperature of 320° C. and a running rate of the base paper of 150 m/min.

As the polyethylene resin composition for coating the base paper, there was used the following resin composition (1BL) according to the present invention or any of the following resin compositions (2BL to 4BL) for comparison.

Resin composition 1BL): 80 Parts by weight of the high-density polyethylene resin (1HD) and 20 parts by weight of the low-density polyethylene resin (11d) which are described in Table 11 were used in the form of pellets of a polyethylene resin composition composed of a compound resin with a critical shear rate of 4.4 (l/sec) prepared by previously melt-blending the above resins by means of a kneading and extuding machine.

Resin composition (2BL): 80 Parts by weight of the high-density polyethylene resin (1HD) and 20 parts by weight of the low-density polyethylene resin (11d) which are described in Table 11 were used each in the form of pellets by charging the pellets of the resins in a simply mixed state into a melt extruder.

Resin composition (3BL): 80 Parts by weight of the high-density polyethylene resin (4HD) and 20 parts by weight of the low-density polyethylene resin (41d) which are described in Table 11 were used in the form of pellets of a polyethylene resin composition composed of a compound resin with a critical shear rate of 17 (l/sec) prepared by previously melt-blending the above resins by means of a kneading and extuding machine.

Resin composition (4BL): 50 Parts by weight of the high-density polyethylene resin (1HD) and 50 parts by weight of the low-density polyethylene resin (11d) which are described in Table 11 were used in the form of pellets of a polyethylene resin composition composed of a compound resin with a critical shear rate of 1.0 (l/sec) prepared by previously melt-blending the above resins by means of a melt extruder.

Subsequently, the obverse side of the base paper was subjected to corona discharge treatment and then melt extrusion coating with a resin composition consisting of 20 parts by weight of a titanium dioxide pigment master batch consisting of 47.5% by weight of a low-density polyethylene resin (density 0.920 $g/cm^3$, MFR=8.5 g/l0 min), 50% by weight of an anatase type titanium dioxide pigment surface-treated with hydrated aluminum oxide (0.75% by weight in terms of $Al_2O_3$ relative to the weight of titanium dioxide) and 2.5% by weight of zinc stearate, 65 parts by weight of a low-density polyethylene resin (density 0.920 $g/cm^3$, MFR=4.5 g/10 min), and 15 parts by weight of a high-density polyethylene resin (density 0.970 $g/cm^3$, MFR=7.0 g/10 min), to a resin thickness of 32 $\mu m$ at a resin temperature of 320° C. and a running rate of the base paper of 150 m/min. The melt extrusion coatings with polyethylene resin on the obverse side and reverse side were carried out by a so-called tandem method in which the extrusion coatings were carried out one after another. In this case, the surface of the second resin layer containing the titanium dioxide pigment of the resin-coated paper was processed into a glossy surface and the surface of the first resin layer was processed into a mat surface like a paper surface.

Then, the surface of the first resin layer of the resin-coated paper was subjected to corona discharge treatment and then on-machine coating with the following back coating fluid. The back coating fluid consisting of colloidal silica and a styrene-based copolymer latex in the ratio of 1:1 based on dry basis and further containing 0.021 $g/m^2$ of a sodium polystyrenesulfonate and suitable amounts of a coating aid and the like was applied in an amount of 0.21 $g/m^2$ in terms of the latex (weighed in terms of solids) to obtain a support for image-forming material.

As to methods for evaluating the molding processability of the polyethylene resin composition for the first resin layer and the degree of the formation of a gelatinous foreign matter in the first resin layer in the production of the support for image-forming material in the manner described above, and the performance characteristics of the obtained sample as support for image-forming material, the evaluations were carried out by the methods described below.

As to a method for evaluating the molding processability of the polyethylene resin composition for the first resin layer in the production of the support for image-forming material, the degree of neck-in was estimated by measuring the length in the crosswise direction of a resin-coated portion on the reverse side, and there was synthetically evaluated the molding processability including the degree of formation of streaks in a molten resin film; the occurrence of film breakage which depends on the degree of draw down; flow unstability due to surge or draw resonance; and the like. The rating is as follows; ○: good, Δ: slightly inferior but acceptable in practice, x: poor and not acceptable in practice.

A method for estimating a gelatinous foreign matter formed during the melt extrusion of the polyethylene resin composition for the first resin layer was as follows: after the composition was extruded into a film for 8 hours under conditions of a preset temperature of 320° C. and an extrusion rate of 2.5 kg/hr, pieces of the gelatinous foreign matter of 0.1 mm or more in 0.01 $m^2$ of the film were counted and their number was compared with the initial number, whereby the gelatinous foreign matter was estimated. The rating is as follows: ○: the number of pieces of the gelatinous foreign matter after 8 hours was the same as the initial number, Δ: the number of pieces of the gelatinous foreign matter after 8 hours is a little larger than the initial number but acceptable in practice, x: the number of pieces of the gelatinous foreign matter after 8 hours was much larger than the initial number and not acceptable in practice.

As to a method for evaluating the cuttability of the support for image-forming material, the aforesaid color print paper was cut to a length in the lengthwise direction of 11.7 cm with a precision print cutter and the state of the cut surface was evaluated. The rating is as follows; ◎: very good cuttability, namely, almost no whiskery projections were formed, ○: good cuttability though a small number of whiskery projections were formed, Δ: acceptable in practice though a somewhat large number of whiskery projections were formed, x: poor cuttability and not acceptable in practice, namely, a large number of whiskery projections were formed.

As to a method for evaluating the curling properties of the support for image-forming material, the evaluation was carried out as follows. First, after having been subjected to corona discharge treatment, the surface of the second resin layer containing the titanium dioxide pigment of the support for image-forming material was provided with a blue-sensitive emulsion layer containing a yellow coupler, an intermediate layer containing a colors-mingling inhibitor, a green-sensitive emulsion layer containing a magenta coupler, an ultraviolet-absorbing layer containing an ultraviolet absorber, a red-sensitive emulsion layer containing a cyan coupler, and a protective layer, whereby color print paper containing gelatin in a total amount of 8 $g/m^2$ was produced. Each color-sensitive emulsion layer contained silver chlorobromide in an amount corresponding to 0.6 $g/m^2$ of silver nitrate and further contained gelatin necessary for the production, dispersion and film formation of silver halide, suitable amounts of an antifogging agent, sensitizing dyes, a coating aid, a hardening agent and a thickner, a suitable amount of a filter dye, and the like. Subsequently, the color print paper produced was stored at 35° C. and at ordinary humidity for 5 days and then developed with color development, after which the state of curling of the resulting color print having dimensions of 8.2 cm×11.7 cm was estimated. The rating is as follows; ○: satisfactory curling properties, namely, somewhat minus curling (curling to the back coating layer side) or flat, Δ: acceptable in practice though curling occurred to some degree, x: not acceptable in practice, namely, serious curling occurred.

As to a method for evaluating the adhesion between base paper and first resin layer of the support for image-forming material, each sample was stored in a thermo-hygrostat at 50° C. and 60% RH for 24 hours and then separated into the base paper layer and the resin layer of the sample by peeling, and the area percentage of a base paper layer portion adhering to the peeled resin layer was measured, whereby the adhesion between the base paper and the reverse resin layer was evaluated. The rating is as follows; ○: good (area percentage: 100%), Δ: slightly inferior adhesion but acceptable in practice (area percentage: less than 100% and not less than 80%), x: poor adhesion and not acceptable in practice (area percentage: less than 80%).

The results obtained are shown in Table 10.

TABLE 10

| Sample No. | Fiber length of pulp after beating (mm) (Note 1) | Linear pressure of machine calender (kg/cm) | Film thickness non-uniformity index of base paper Rpy (mV) (Note 2) | Kind of poly-etyhylene resin composition for first resin layer | Molding process-ability of polyethylene resin composition for first resin layer | Degree of formation of gelatinous foreign matter | Cut-tability | Curling properties | Adhesion between base paper and first resin layer |
|---|---|---|---|---|---|---|---|---|---|
| 1 | 0.50 | 70 | 119 | 1BL | ○ | ○ | ◎ | ○ | o |
| 2 | 0.55 | 70 | 125 | 1BL | ○ | ○ | ◎ | ○ | ○ |
| 3 | 0.55 | 70 | 125 | 3BL | ○ | x | ◎ | Δ | ○ |
| 4 | 0.55 | 70 | 125 | 4BL | ○ | ○ | ◎ | x | ○ |
| 5 | 0.60 | 70 | 130 | 1BL | ○ | ○ | ◎ | ○ | ○ |
| 6 | 0.60 | 70 | 130 | 2BL | x | (x) | x | ○ | ○ |
| 7 | 0.60 | 70 | 130 | 3BL | ○ | x | ◎ | Δ | ○ |
| 8 | 0.60 | 70 | 130 | 4BL | ○ | ○ | ◎ | x | ○ |
| 9 | 0.65 | 70 | 135 | 1BL | ○ | ○ | ○ | ○ | ○ |
| 10 | 0.65 | 70 | 135 | 3BL | ○ | x | ◎ | Δ | ○ |
| 11 | 0.65 | 70 | 135 | 4BL | ○ | ○ | ◎ | x | ○ |
| 12 | 0.65 | 90 | 131 | 1BL | ○ | ○ | ○ | ○ | ○ |
| 13 | 0.65 | 90 | 131 | 3BL | ○ | x | ◎ | Δ | ○ |
| 14 | 0.65 | 90 | 131 | 4BL | ○ | ○ | ◎ | x | ○ |
| 15 | 0.65 | 150 | 127 | 1BL | ○ | ○ | ◎ | ○ | ○ |
| 16 | 0.65 | 150 | 127 | 3BL | ○ | x | ◎ | Δ | o |
| 17 | 0.65 | 150 | 127 | 4BL | ○ | ○ | ◎ | x | o |
| 18 | 0.70 | 70 | 140 | 1BL | ○ | ○ | Δ | ○ | ○ |
| 19 | 0.70 | 90 | 136 | 1BL | ○ | ○ | Δ | ○ | ○ |
| 20 | 0.70 | 90 | 136 | 3BL | ○ | x | ○ | ○ | ○ |
| 21 | 0.70 | 90 | 136 | 4BL | ○ | ○ | ○ | x | ○ |
| 22 | 0.75 | 150 | 140 | 1BL | ○ | ○ | Δ | ○ | ○ |
| 23 | 0.85 | 150 | 152 | 1BL | ○ | ○ | x | ○ | ○ |

(x): A gelatinous foreign matter was formed from the early stage.

TABLE 11

| Resin | Kind | MRF (g/10 min) | Density (g/cm$^3$) | Percentage of molecules with a molecular weight of 500,000 or more (% by weight) | Critical shear rate (l/sec) |
|---|---|---|---|---|---|
| High-density | 1HD | 15 | 0.967 | — | 60 |
| polyethylene | 2HD | 20 | 0.967 | — | 70 |
| (HDPE) | 3HD | 7 | 0.967 | — | 27 |
| | 4HD | 20 | 0.960 | — | 70 |
| | 5HD | 28 | 0.967 | — | 80 or more |
| | 6HD | 38 | 0.967 | — | 80 or more |
| | 7HD | 45 | 0.967 | — | 80 or more |
| Low-density | 11d | 0.6 | 0.924 | 15.0 | 0.06 |
| polyethylene | 21d | 0.9 | 0.924 | 13.9 | 0.20 |
| (LDPE) | 31d | 1.2 | 0.924 | 13.4 | 0.36 |
| | 41d | 1.2 | 0.918 | 15.6 | 0.53 |
| | 51d | 3.5 | 0.926 | 9.1 | 1.6 |
| | 61d | 0.8 | 0.923 | 4.1 | 1.5 |
| | 71d | 0.4 | 0.923 | 9.2 | 0.32 |

(Note 1) and (Note 2) in Table 10 are as follows.

(Note 1): There is shown the length weighted average fiber length (mm) measured for beaten pulp according to JAPAN TAPPI Paper Pulp Test Method No. 52-89 "Test Methods of Fiber Length of Paper and Pulp". The measurement was carried out with a meter Model FS-100 mfd. by Kayani Co. Ltd.

(Note 2): There is shown the film thickness nonuniformity index Rpy (mV) measured by the method specified in the present description.

From the results shown in Table 10, it can be well seen that the supports for image-forming material (samples No. 1, No. 2, No. 5, No. 9, No. 12, No. 15, No. 18 and No. 22) obtained by using paper with a film thickness nonuniformity index Rpy of 140 mV or less as a substrate, and coating the base paper on the side reverse to the side on which an image-forming layer is to be formed, with a resin composition composed of a specific compound resin prepared by previously melt-blending the high-density polyethylene resin and low-density polyethylene resin according to the present invention, are excellent supports for image-forming material which are good in the molding processability of the resin composition, do not contain a gelatinous foreign matter formed, have a markedly improved and satisfactory cuttability, and are satisfactory in curling properties and the adhesion between the base paper and the resin layer. In particular, it can be well seen that from the viewpoint of the cuttability of the support for image-forming material, the base paper is preferably one which has a film thickness nonuniformity index Rpy of 135 mV or less, more preferably 130 mV or less.

On the other hand, when the film thickness nonuniformity index Rpy is more than 140 mV (sample No. 23), the cuttability of the support for image-forming material is undesirably poor. When a resin composition composed of a compound resin (3BL) having a critical shear rate of more than 10 (l/sec) is used as a resin composition for coating the reverse side of the base paper (samples No. 3, No. 7, No. 10, No. 13, No. 16 and No. 20), a large amount of a gelatinous foreign matter is disadvantageously formed. When a resin composition composed of a compound resin (4BL) having a content of the high-density polyethylene resin of less than 65% by weight is used (samples No. 4, No. 8, No. 11, No. 14, No. 17 and No. 21), the curling properties are not satisfactory. Therefore, it is not desirable. When simple mixing is employed as a method for preparing the resin composition (sample No. 5), the molding processability and cuttability of the resin composition are not good and a large amount of a gelatinous foreign matter is formed from the early stage. Therefore, it is not desirable.

EXAMPLE 33

An experiment was carried out in the same manner as in the case of sample No. 5 in Example 32 except that in place of the polyethylene resin composition pellets for coating the reverse side which were used in No. 5 in Example 32, there were used pellets of each polyethylene resin composition composed of a compound resin having the critical shear rate described in Table 12 which had been prepared by previously melt-blending a high-density polyethylene resin (1HD listed in Table 11) and a low-density polyethylene resin (11d listed in Table 11) in amounts described in Table 12, respectively, by means of a kneading and extruding machine.

The results obtained are shown in Table 12.

TABLE 12

| Sample No. | Make-up of polyethylene resin composition for first resin layer (parts by weight): High-density polyethylene resin | Low-density polyethylene resin | Critical shear rate of compound resin composition for first resin layer (l/sec) | Molding processability of polyethylene resin composition for first resin layers | Degree of formation of gelatinous foreign mater | Cuttability | Curling properties | Adhesion between base paper and first resin layer |
|---|---|---|---|---|---|---|---|---|
| 24 | 95 | 5 | 30 | x | x | x | ○ | x |
| 25 | 90 | 10 | 10 | Δ | Δ | Δ | ○ | Δ |
| 26 | 85 | 15 | 6.2 | ○ | ○ | ○ | ○ | ○ |
| 27 | 80 | 20 | 4.4 | ○ | ○ | ◎ | ○ | ○ |
| 28 | 70 | 30 | 2.8 | ○ | ○ | ◎ | ○ | ○ |
| 29 | 65 | 35 | 2.2 | ○ | ○ | ◎ | Δ | ○ |
| 30 | 50 | 50 | 1.0 | ○ | ○ | ◎ | x | o |

From the results shown in Table 12, it can be well seen that the supports for image-forming material according to the present invention (samples No. 25 to No. 29) obtained by coating the base paper with a resin composition composed of a compound resin with a critical shear rate of 10 (l/sec) or less prepared by previously melt-blending 90 to 65 parts by weight of the high-density polyethylene resin and 10 to 35 parts by weight of the low-density polyethylene resin, are excellent supports for image-forming material which are good in the molding processability of the resin composition, do not contain a gelatinous foreign matter formed, are good in cuttability of the support for image-forming material, and are satisfactory in the adhesion between the base paper and the first resin layer. In particular, it can be well seen that the content of the high-density polyethylene resin in the compound resin is preferably in the range of 85 to 70 parts by weight from the viewpoint of the synthetic performance characteristics of the support for image-forming material, and is more preferably in the range of 80 to 70 parts by weight from the viewpoint of the cuttability of the support for image-forming material.

On the other hand, when the content of the high-density polyethylene resin is more than 90 parts by weight (No. 24), the molding processability of the polyethylene resin composition is poor, a large amount of a gelatinous foreign matter is formed, and the cuttability of the support for image-forming material and the adhesion between the base paper and the first resin layer are not satisfactory. Therefore, it is not desirable. When the content of the high-density polyethylene resin is less than 65 parts by weight (No. 30), the curling properties are not satisfactory. Therefore, it is not desirable.

EXAMPLE 34

An experiment was carried out in the same manner as in the case of sample No. 5 in Example 32 except that in place of the polyethylene resin composition pellets for coating the reverse side which were used in No. 5 in Example 32, there were used pellets of each polyethylene resin composition composed of a compound resin prepared in the same manner as in the case of sample No. 5 in Example 32 except for blending the polyethylene resins described in Table 11 in the proportions described in Table 13.

The results obtained are shown in Table 13.

From the results shown in Table 13, it can be well seen that the supports for image-forming material according to the present invention (samples No. 31 to No. 41) in which the polyethylene resin composition for the first resin layer is a polyethylene resin composition composed of a compound resin prepared by previously melt-blending 90 to 65 parts by weight of a high-density polyethylene resin having an MFR of 10–40 g/10 min and a density of 0.960 g/$cm^3$ or more and 10 to 35 parts by weight of a low-density polyethylene resin having an MFR of 0.2–2 g/10 min, a density of 0.935 g/$cm^3$ or less, a percentage of molecules with a molecular weight of 500,000 or more of 10% by weight or more and a critical shear rate of 0.5 (l/sec) or less, and the critical shear rate of the compound resin is 10 (l/sec) or less, are excellent supports for image-forming material which are good in the molding processability of the polyethylene resin composition, do not contain a gelatinous foreign matter formed, are good in cuttability of the support for image-forming material, and are satisfactory in curling properties and the adhesion between the base paper and the first resin layer.

In particular, it can be well seen that for preventing the formation of a gelatinous foreign matter, the low-density polyethylene resin for the compound resin is preferably one which have an MFR of less than 1 g/10 min (comparison of samples No. 32 and No. 38 with sample No. 39). The following can be also well seen: from the viewpoint of the curling properties, the high-density polyethylene resin for the compound resin is preferably one which has a density of 0.962 g/$cm^3$ or more (comparison of samples No. 32 and No. 36 with sample No. 37), and from the viewpoint of the molding processability of the polyethylene resin composition, the preventive effect on a gelatinous foreign matter, and the adhesion between the base paper and the first resin layer, the high-density polyethylene resin is preferably one which has an MFR in the range of 10–30 g/10 min

TABLE 13

| Sample No. | Make-up of polyethylene resin composition for first resin layer (parts by weight): High-density polyethylene resin, Kind | Proportion (parts by weight) | Low-density polyethylene resin, Kind | Proportion (parts by weight) | Critical shear rate of polyethylene resin composition for first regin layer (l/sec) | Molding processability of polyethylene resin composition for first resin layers | Degree of formation of gelatinous foreign matter | Cut-tability | Curling properties | Adhesion between base paper and first resin layer |
|---|---|---|---|---|---|---|---|---|---|---|
| 31 | 1HD | 75 | 11d | 25 | 3.1 | ○ | ○ | ⊚ | ○ | ○ |
| 32 | 1HD | 80 | 11d | 20 | 4.4 | ○ | ○ | ⊚ | ○ | ○ |
| 33 | 2HD | 65 | 11d | 35 | 1.7 | ○ | ○ | ⊚ | Δ | ○ |
| 34 | 2HD | 70 | 11d | 30 | 2.8 | ○ | ○ | ⊚ | ○ | ○ |
| 35 | 2HD | 75 | 11d | 25 | 3.7 | ○ | ○ | ⊚ | ○ | ○ |
| 36 | 2HD | 80 | 11d | 20 | 6.3 | ○ | ○ | ⊚ | ○ | ○ |
| 37 | 4HD | 80 | 11d | 20 | 6.7 | ○ | ○ | ⊚ | Δ | ○ |
| 38 | 1HD | 80 | 21d | 20 | 7.0 | ○ | ○ | ⊚ | ○ | ○ |
| 39 | 1HD | 80 | 31d | 20 | 8.0 | ○ | Δ | ⊚ | ○ | ○ |
| 40 | 5HD | 80 | 11d | 20 | 7.3 | ○ | ○ | ⊚ | ○ | ○ |
| 41 | 6HD | 80 | 11d | 20 | 8.2 | Δ | Δ | ⊚ | ○ | Δ |
| 42 | 4HD | 80 | 41d | 20 | 17 | x | x | ⊚ | Δ | ○ |
| 43 | 1HD | 80 | 51d | 20 | 17 | x | x | ⊚ | ○ | ○ |
| 44 | 4HD | 80 | 51d | 20 | 20 | x | x | ⊚ | Δ | Δ |
| 45 | 1HD | 80 | 61d | 20 | 20 | x | x | ⊚ | ○ | ○ |
| 46 | 1HD | 80 | 71d | 20 | 9.0 | x | Δ | ⊚ | ○ | ○ |
| 47 | 3HD | 80 | 11d | 20 | 7.5 | ○ | ○ | x | ○ | ○ |
| 48 | 7HD | 80 | 11d | 20 | 10.4 | x | x | ⊚ | ○ | x |

(comparison of samples No. 32 and No. 36 with samples No. 40 and No. 41). In addition, it can be well seen that the compound resin is preferably one which has a critical shear rate of less than 8 (l/sec) (comparison of samples No. 31 to No. 38 and No. 40 with samples No. 39 and No. 41).

On the other hand, when the MFR of the low-density polyethylene resin for the compound resin is more than 2 g/10 min (sample No. 44), the molding processability of the polyethylene resin composition and the degree of the formation of a gelatinous foreign matter are not satisfactory. Therefore, it is not desirable. When the percentage of molecules with a molecular weight of 500,000 or more of the low-density polyethylene resin for the compound resin is less than 10% by weight (samples No. 43 to No. 46), the molding processability of the polyethylene resin composition is undesirably poor, and a large amount of a gelatinous foreign matter tends to be formed. When the MFR of the high-density polyethylene resin for the compound resin is more than 40 g/10 min (sample No. 48), the molding processability of the polyethylene type resin composition, the degree of the formation of a gelatinous foreign matter, and the adhesion between the base paper and the resin layer are not satisfactory. Therefore, it is not desirable. When the critical shear rate of the compound resin composition is more than 10 (l/sec) (samples No. 42 to No. 45 and No. 48), a large amount of a gelatinous foreign matter is disadvantageously formed.

The present invention makes it possible to provide an excellent resin-coated paper type support for image-forming material which does not contain a gelatinous foreign matter formed in the resin layer on the side reverse to the side on which an image-forming layer is to be formed; is markedly good in cuttability; is satisfactory in curling properties and the adhesion between base paper and the resin layer; and can be produced rapidly and stably.

EXAMPLE 35

70Parts by weight of a high-density polyethylene having an MFR of 15.0 g/10 min and a density of 0.967 g/cm$^3$ and 30 parts by weight of a low-density polyethylene having an MFR of 0.6 g/10 min, a density of 0.924 g/cm$^3$, a percentage of molecules with a molecular weight of 500,000 or more of 15% by weight, and a critical shear rate of 0.06 (l/sec) were previously melt-blended and then extruded onto paper having a high smoothness and a basis weight of 170 g/m$^2$, to a thickness of 25 $\mu$m from an extruder at a resin temperature of 320° C. to coat the paper, whereby the production was carried out.

As to a method for evaluating the molding processability during the melt extrusion coating of the resins, the degree of neck-in was estimated by measuring the length in the crosswise direction of a resin-coated portion, and there was synthetically evaluated the molding processability including the degree of formation of streaks in a molten resin film; the occurrence of film breakage which depends on the degree of draw down; flow unstability due to surge or draw resonance; and the like. The rating is as follows; ○: good, Δ: slightly inferior but acceptable in practice, x: poor and not acceptable in practice.

As to a method for evaluating the adhesion between base paper and resin layer of the polyethylene-type-resin-coated paper, a sample was separated into its base paper layer and polyethylene layer by peeling, and the area percentage of a base paper layer portion adhering to the peeled polyethylene layer was measured, whereby the adhesion between the base paper and the resin layer was evaluated. The rating is as follows; ○: good (area percentage: 100%), Δ: slightly inferior adhesion but acceptable in practice (area percentage: less than 100% and not less than 80%), x: poor adhesion and not acceptable in practice (area percentage: less than 80%).

A method for estimating a gel formed during the melt extrusion of the resins was as follows: after the resins were extruded into a film for 8 hours under conditions of a preset temperature of 320° C. and an extrusion rate of 2.5 kg/hr by varying the screw revolution rate, the aperture percentage of a breaker plate, and the total mesh of screen packs according to the conditions shown in Table 15, pieces of the gel of 0.1 mm or more in 0.01 m$^2$ of the film were counted and their number was compared with the initial number, whereby the gel was estimated. The rating is as follows: ○: the number of pieces of the gel after 8 hours was the same as the initial number, x: the number of pieces of the gel after 8 hours was larger than the initial number.

As to a method for evaluating the fabrication properties of the polyethylene-type-resin-coated paper, there were synthetically evaluated fabrication properties including cuttability evaluated from the degree of fluffing of the cut surface of a sample formed by cutting the sample with a commercial guillotine cutter; abrasion resistance evaluated from the degree of scratches on the surface of the resin layer which were made by placing the resin layer surfaces of two sheets of the resin-coated paper one upon another and rubbing them together; the nerve of the resin-coated paper; and the like. The rating is as follows; ○: good, Δ: slightly inferior but acceptable in practice, x: poor and not acceptable in practice.

EXAMPLES 36 TO 41

An experiment was carried out in the same manner as in Example 35 except for changing the kinds and proportions of resins for the polyethylene resin composition to those described in Table 14 and Table 15, respectively.

The results obtained are shown in Table 15 and Table 16.

TABLE 14

| Resin | Kind | MRF g/10 min | Density g/cm$^3$ | Percentage of molecules with a molecular weight of 500,000 or more % by weight | Critical shear rate l/sec |
|---|---|---|---|---|---|
| High-density | A | 15 | 0.967 | — | 60 |
| polyethylene | B | 20 | 0.960 | — | 70 |
| (HDPE) | C | 7 | 0.967 | — | 27 |
| Low-density | d | 0.6 | 0.924 | 15.0 | 0.06 |
| polyethylene | e | 1.2 | 0.918 | 15.6 | 0.53 |
| (LDPE) | f | 3.5 | 0.926 | 9.1 | 1.6 |

TABLE 15

| Sample | HDPE Kind | HDPE Portion parts by weight | LDPE Kind | LDPE Portion parts by weight | Critical shear rate l/sec | Screw revolution rate rpm | Aperture percentage of breaker plate | Total mesh of screen packs | Resin pressure kgf/cm$^2$ | Critical resin pressure kgf/cm$^2$ |
|---|---|---|---|---|---|---|---|---|---|---|
| Example 35 | A | 70 | d | 30 | 2.3 | 35 | 40 | 500 | 12 | 6 |
| Example 36 | A | 75 | d | 25 | 3.1 | 35 | 40 | 1000 | 20 | 12 |
| Example 37 | B | 80 | e | 20 | 17.0 | 35 | 10 | 1000 | 26 | 25 |
| Example 38 | B | 80 | e | 20 | 17.0 | 60 | 10 | 500 | 37 | 20 |
| Example 39 | B | 80 | e | 20 | 17.0 | 35 | 40 | 500 | 7 | 25 |
| Example 40 | A | 97 | d | 3 | 40.0 | 60 | 10 | 1000 | 16 | 18 |
| Example 41 | C | 65 | f | 35 | 5.2 | 35 | 40 | 500 | 15 | 14 |

TABLE 16

| Sample | Gel | Adhesion | Molding processability | Fabrication properties |
|---|---|---|---|---|
| Example 35 | ○ | ○ | ○ | ○ |
| Example 36 | ○ | ○ | ○ | ○ |
| Example 37 | ○ | ○ | ○ | ○ |
| Example 38 | ○ | ○ | ○ | ○ |
| Example 39 | x | ○ | ○ | ○ |
| Example 40 | x | x | x | ○ |
| Example 41 | ○ | ○ | ○ | x |

From the results shown in Table 15, it can be well seen that the polyethylene-type-resin-coated papers produced by coating under melt extrusion conditions where the resin pressure at the end of screw of the extruder is higher than the critical resin pressure (Examples 35 to 38), are excellent polyethylene-type-resin-coated papers which do not contain a gel formed and are good in molding processability and the adhesion between the resin layer and the base paper. In particular, it can be well seen that no gel is formed also when the revolution rate is low but the resin pressure is higher than the critical resin pressure (Example 37).

On the other hand, when the resin pressure at the end of screw of the extruder is lower than the critical resin pressure (Examples 39 and 40), gel is serious. Therefore, it is not desirable. When the content of the high-density polyethylene is more than 90 parts by weight (Example 40), gel, the adhesion between the base paper and the resin layer, and the molding processability are not satisfactory. Therefore, it is not desirable. When the MFR of the high-density polyethylene is less than 10 g/10 min (Example 41), the fabrication properties are undesirably poor.

The present invention makes it possible to provide an excellent polyethylene-type-resin-coated paper which is good in the molding processability of its resin layer and the adhesion between the resin layer and base paper, and can prevent gel in the resin layer.

EXAMPLE 42

Mixed pulp of bleached sulfite hardwood pulp and bleached kraft hardwood pulp in the ratio of 1:1 was beaten to adjust its Canadian standard freeness to 320 ml. Then, to 100 parts by weight of the pulp were added 3 parts by weight of cationized starch, 0.2 part by weight of an anionized polyacrylamide, 0.4 part by weight of an alkylketene dimer emulsion (in terms of the ketene dimer) and 0.4 part by weight of a polyamino polyamide epichlorohydrin resin, and paper having a basis weight of 160 g/m$^2$ was made from them. The wet web thus obtained was dried at 110° C., subsequently impregnated with an impregnating solution consisting of 3 parts by weight of a carboxy-modified poly(vinyl alcohol), 0.05 part by weight of a fluorescent whitening agent, 0.002 part by weight of a blue dye, 4 parts by weight of sodium chloride, 0.2 part by weight of citric acid and 93 parts by weight of water, in an amount of 25 g/m$^2$, dried in hot air so as to adjust the water content of finally obtained base paper to 8% by weight in the bone-dry state, and then super-calendered at a linear pressure of 90 kg/cm to produce base paper for a support for image-forming material. The Bekk smoothness of the base paper in this case was 200 seconds.

Next, the side (the reverse side) of the base paper which was reverse to the side on which an image-forming layer was to be formed by coating was subjected to corona discharge treatment and then melt extrusion coating with each polyethylene resin composition described in Table 17 to a resin thickness of 25 $\mu$m at a resin temperature of 320° C. and a running rate of the base paper of 150 m/min. In this case, there was used a cooling roll capable of adjusting the center plane average roughness SRa of the surface of the first resin layer to the surface roughness described in Table 17. The cooling roll used was such that its surface had been roughened by a liquid honing method. Using this cooling roll, the melt extrusion coating was carried out at a cooling water temperature of 12° C.

Subsequently, the obverse side of the base paper was subjected to corona discharge treatment and then melt extrusion coating with a resin composition consisting of 20 parts by weight of a titanium dioxide pigment master batch consisting of 47.5% by weight of a low-density polyethylene resin (density 0.920 g/cm$^3$, MFR=8.5 g/10 min), 50% by weight of an anatase type titanium dioxide pigment surface-treated with hydrated aluminum oxide (0.75% by weight in terms of $Al_2O_3$ relative to the weight of titanium dioxide) and 2.5% by weight of zinc stearate, 65 parts by weight of a low-density polyethylene resin (density 0.920 g/cm$^3$, MFR=4.5 g/10 min), and 15 parts by weight of a high-density polyethylene resin (density 0.970 g/cm$^3$, MFR=7.0 g/10 min), to a resin thickness of 32 $\mu$m at a resin temperature of 320° C. and a running rate of the base paper of 150 m/min. The melt extrusion coatings with polyethylene resin on the obverse side and reverse side were carried out by a so-called tandem method in which the extrusion coatings were carried out one after another. In this case, the surface of the second resin layer containing the titanium dioxide pigment of the resin-coated paper was processed into a glossy surface.

Then, the surface of the first resin layer of the resin-coated paper was subjected to corona discharge treatment and then on-machine coating with the following back coating fluid. The back coating fluid consisting of colloidal silica and a styrene-based copolymer latex in the ratio of 1:1 based on dry basis and further containing 0.021 g/m$^2$ of a sodium polystyrenesulfonate and suitable amounts of a coating aid and the like was applied in an amount of 0.21 g/m$^2$ in terms of the latex (weighed in terms of solids) to obtain a support for image-forming material.

As to methods for evaluating the molding processability of the polyethylene resin composition for the first resin layer, the degree of formation of cooling roll stains, and the degree of the formation of a gelatinous foreign matter in the production of the support for image-forming material in the manner described above, and the performance characteristics of the obtained sample as support for image-forming material, the evaluations were carried out by the methods described below.

As to a method for evaluating the molding processability of the polyethylene resin composition for the first resin layer in the production of the support for image-forming material, the degree of neck-in was estimated by measuring the length in the crosswise direction of a resin-coated portion on the reverse side, and there was synthetically evaluated the molding processability including the degree of formation of streaks in a molten resin film; the occurrence of film breakage which depends on the degree of draw down; flow unstability due to surge or draw resonance; and the like. The rating is as follows; ○: good, Δ: slightly inferior but acceptable in practice, x: poor and not acceptable in practice.

As to a method for estimating cooling roll stains formed during the melt extrusion of the polyethylene resin composition for the first resin layer, the estimation was carried out by judging the degree of formation of stains on the cooling roll visually 6 hours after the start of production of the image-forming material under the above production conditions. The rating is as follows: ○: satisfactory, namely, few cooling roll stains were formed, Δ: acceptable in practice though a somewhat large number of cooling roll stains were formed, x: not acceptable in practice, namely, a large number of cooling roll stains were formed.

A method for estimating a gelatinous foreign matter formed during the melt extrusion of the polyethylene resin composition for the first resin layer was as follows: after the composition was extruded into a film for 8 hours under conditions of a preset temperature of 320° C. and an extrusion rate of 2.5 kg/hr, pieces of the gelatinous foreign matter of 0.1 mm or more in 0.01 m$^2$ of the film were counted and their number was compared with the initial number, whereby the gelatinous foreign matter was estimated. The rating is as follows: ○: the number of pieces of the gelatinous foreign matter after 8 hours was the same as the initial number, Δ: the number of pieces of the gelatinous foreign matter after 8 hours is a little larger than the initial number but acceptable in practice, x: the number of pieces of the gelatinous foreign matter after 8 hours was much larger than the initial number and not acceptable in practice.

As to a method for evaluating the cuttability of the support for image-forming material, the aforesaid color print paper was cut to a length in the lengthwise direction of 11.7 cm with a precision print cutter and the state of the cut surface was evaluated. The rating is as follows; ◎: very good cuttability, namely, almost no whiskery projections were formed, ○: good cuttability though a small number of whiskery projections were formed, Δ: acceptable in practice though a somewhat large number of whiskery projections were formed, x: poor cuttability and not acceptable in practice, namely, a large number of whiskery projections were formed.

As to a method for evaluating the curling properties of the support for image-forming material, the evaluation was carried out as follows. First, after having been subjected to corona discharge treatment, the surface of the second resin layer containing the titanium dioxide pigment of the support for image-forming material was provided with a blue-sensitive emulsion layer containing a yellow coupler, an intermediate layer containing a colors-mingling inhibitor, a green-sensitive emulsion layer containing a magenta coupler, an ultraviolet-absorbing layer containing an ultraviolet absorber, a red-sensitive emulsion layer containing a cyan coupler, and a protective layer, whereby color print paper containing gelatin in a total amount of amount of 8 g/m$^2$ was produced. Each color-sensitive emulsion layer contained silver chlorobromide in an amount corresponding to 0.6 g/m$^2$ of silver nitrate and further contained gelatin necessary for the production, dispersion and film formation of silver halide, suitable amounts of an antifogging agent, sensitizing dyes, a coating aid, a hardening agent and a thickner, a suitable amount of a filter dye, and the like. Subsequently, the color print paper produced was stored at 35° C. and at ordinary humidity for 5 days and then developed with color development, after which the state of curling of the resulting color print having dimensions of 8.1 cm×11.7 cm was estimated. The rating is as follows; ○: satisfactory curling properties, namely, somewhat minus curling (curling to the back coating layer side) or flat, Δ: acceptable in practice though curling occurred to some degree x: not acceptable in practice, namely, serious curling occurred.

As to a method for evaluating the adhesion between base paper and first resin layer of the support for image-forming material, each sample was stored in a thermo-hygrostat at 50° C. and 60% RH for 24 hours and then separated into the base paper layer and the first resin layer of the sample by peeling, and the area percentage of a base paper layer portion adhering to the peeled resin layer was measured, whereby the adhesion between the base paper and the reverse resin layer was evaluated. The rating is as follows; ○: good (area percentage: 100%), Δ: slightly inferior adhesion but acceptable in practice (area percentage: less than 100% and not less than 80%), x: poor adhesion and not acceptable in practice (area percentage: less than 80%).

The results obtained are shown in Table 17.

TABLE 17

| Sample No. | Make-up of polyethylene resin composition for first resin layer (parts by weight) HDPE (Note 1) | LDPE (Note 2) | Method for preparing polyethylene resin composition for first resin layer (Note 3) | Critical shear rate of polyethylene resin composition for first regin layer (l/sec) | SRa of surface of first resin layer of resin-coated paper (μm) (Note 4) | Molding processability of polyethylene resin composition for first resin layers | Cooling roll stains | Degree of formation of gelatinous foreign matter | Adhesion between base paper and first resin layer | Curling properties | Cuttability |
|---|---|---|---|---|---|---|---|---|---|---|---|
| 1 | 95 | 5 | Compound | 30 | 1.3 | x | x | x | x | ○ | x |
| 2 | 90 | 10 | " | 10 | 1.3 | Δ | Δ | Δ | Δ | ○ | Δ |
| 3 | 80 | 20 | " | 4.4 | 1.3 | ○ | ○ | ○ | ○ | ○ | ○ |
| 4 | 70 | 30 | " | 2.8 | 0.45 | ○ | x | ○ | ○ | ○ | ○ |
| 5 | 70 | 30 | " | 2.8 | 0.6 | ○ | Δ | ○ | ○ | ○ | ○ |
| 6 | 70 | 30 | " | 2.8 | 0.8 | ○ | ○ | ○ | ○ | ○ | ○ |
| 7 | 70 | 30 | " | 2.8 | 1.3 | ○ | ○ | ○ | ○ | ○ | ○ |
| 8 | 70 | 30 | " | 2.8 | 1.6 | ○ | ○ | ○ | ○ | ○ | ○ |
| 9 | 70 | 30 | " | 2.8 | 2.0 | ○ | Δ | ○ | ○ | ○ | ○ |
| 10 | 70 | 30 | " | 2.8 | 2.5 | ○ | x | ○ | ○ | ○ | ○ |
| 11 | 70 | 30 | Simple blending | — | 1.3 | x | ○ | (x) | ○ | ○ | x |
| 12 | 65 | 35 | Compound | 2.2 | 1.3 | ○ | ○ | ○ | ○ | Δ | ○ |
| 13 | 50 | 50 | " | 1.0 | 1.3 | ○ | ○ | ○ | ○ | x | o |

(x): A gelatinous foreign matter was formed from the early stage.

(Note 1) HDPE: a high-density polyethylene resin having a density of 0.967 $g/cm^3$ and an MFR of 15 g/10 min.

(Note 2) LDPE: a low-density polyethylene resin having a density of 0.924 $g/cm^3$, an MFR of 0.6 g/10 min, a percentage of molecules with a molecular weight of 500,000 or more of 15% by weight and a critical sear rate of 0.06 (l/sec).

(Note 3) Preparation method of a polyethylene resin composition~Compound: the HDPE and the LDPE were used in the form of pellets of a compound resin prepared by previous melt blending by means of an extruder for kneading. Simple blending: the HDPE and the LDPE were used by charging them into a melt extruder in the form of a mixture obtained by simple blending.

(Note 4) There is shown the center plane average roughness SRa (μm) of the surface of the first resin layer of the support for image-forming material, which was measured by the method specified in the present description.

From the results shown in Table 17, it can be well seen that the supports for image-forming material (samples No. 2, No. 3, No. 5 to No. 9, and No. 12) in which the center plane average roughness SRa of the surface of the first resin layer is 0.6 to 2.0 μm and the polyethylene resin in the first resin layer is a compound resin prepared by previously melt-blending 90 parts by weight to 65 parts by weight of the high-density polyethylene resin and 10 parts by weight to 35 parts by weight of the low-density polyethylene resin according to the present invention, are excellent supports for image-forming material which are good in the molding processability of the polyethylene resin composition, are free from cooling roll stains, do not contain a gelatinous foreign matter formed, and are satisfactory in the adhesion between the base paper and the resin layer, curling properties and cuttability. In particular, it can be well seen that for the synthetic performance characteristics of the support for image-forming material, the content of the HDPE is preferably in the range of 85 parts by weight to 70 parts by weight, and that for the improving effect on cooling roll stains, the center plane average roughness SRa of the surface of the reverse resin layer of the support for image-forming material is preferably in the range of 0.8 to 1.6 μm.

On the other hand, when the content of the high-density polyethylene resin is more than 90 parts by weight (sample No. 1), the molding processability of the polyethylene resin composition is poor, a large number of cooling roll stains are formed, a large amount of a gelatinous foreign matter is formed, and the adhesion between the base paper and the resin layer is poor. Therefore, it is not desirable. When the content of the high-density polyethylene resin is less than 65 parts by weight (sample No. 13), the curling properties are not satisfactory. Therefore, it is not desirable. When simple blending is employed as a method for preparing the polyethylene resin composition (No. 11), the molding processability and cuttability of the polyethylene resin composition are not good and a large amount of a gelatinous foreign matter is formed from the early stage. Therefore, it is not desirable. In addition, when the center plane average roughness SRa of the surface of the first resin layer is less than 0.6 μm, (sample No. 4), a large number of cooling roll stains are undesirably formed. On the other hand, also when the center plane average roughness SRa of the surface of the first resin layer is more than 2.0 μm (sample No. 10), a large number of cooling roll stains are undesirably formed. In this case, there was also caused a problem of clouding which appeared everywhere on the specular surface on the obverse side after winding-up of the support for image-forming material.

EXAMPLE 43

An experiment was carried out in the same manner as in the case of No. 7 in Example 42 except that each compound resin composition prepared in the same manner as in the case of No. 7 in Example 42 except for using the polyethylene resins described in Table 18 in the proportions described in Table 19 was used in place of the polyethylene resin composition for coating the reverse side which was used in No. 7 in Example 42.

The results obtained are shown in Table 19.

TABLE 18

| Resin | Kind | MRF (g/10 min) | Density (g/cm$^3$) | Percentage of molecules with a molecular weight of 500,000 or more (% by weight) | Critical shear rate l/sec |
|---|---|---|---|---|---|
| High-density | A | 15 | 0.967 | — | 60 |
| polyethylene | B | 20 | 0.967 | — | 70 |
| (HDPE) | C | 7 | 0.967 | — | 27 |
| | D | 20 | 0.960 | — | 70 |
| | E | 28 | 0.967 | — | 80 or more |
| | F | 38 | 0.967 | — | 80 or more |
| | G | 45 | 0.967 | — | 80 or more |
| Low-density | h | 0.6 | 0.924 | 15.0 | 0.06 |
| polyethylene | i | 0.9 | 0.924 | 13.9 | 0.20 |
| (LDPE) | j | 1.2 | 0.924 | 13.4 | 0.36 |
| | k | 1.2 | 0.918 | 15.6 | 0.53 |
| | l | 3.5 | 0.926 | 9.1 | 1.6 |
| | m | 0.8 | 0.923 | 4.1 | 1.5 |
| | n | 0.4 | 0.923 | 9.2 | 0.32 |

foreign matter formed, and are satisfactory in the adhesion between the base paper and the resin layer, curling properties and cuttability.

In particular, it can be well seen that for preventing the formation of a gelatinous foreign matter, the low-density polyethylene resin is preferably one which have an MFR of less than 1 g/10 min (comparison of samples No. 15 and No. 21 with sample No. 22). The following can be also well seen: from the viewpoint of the curling properties, the high-density polyethylene resin is preferably one which has a density of 0.962 g/cm$^3$ or more (comparison of samples No. 15 and No. 19 with sample No. 20), and from the viewpoint of the molding processability, the preventive effect on a gelatinous foreign matter, and the adhesion between the base paper and the resin layer, the high-density polyethylene resin is preferably one which has an MFR in the range of 10 g/10 min to 30 g/10 min (comparison of samples No. 15, No. 19 and No. 23 with sample No. 24). In addition, it can be well seen that the compound resin composition used for carrying out the present invention is preferably one which has a critical shear rate of less than 8 (l/sec) (comparison of samples No. 14 to No. 21 and No. 23 with samples No. 22 and No. 24).

TABLE 19

| | Make-up of compound resin composition for first resin layer | | | | Critical shear rate of compound resin composition for first regin layer | Molding processability of poly-ethylene resin composition for first resin layers | | Degree of formation of gelatinous foreign matter | Adhesion between base paper and first resin layer | | |
|---|---|---|---|---|---|---|---|---|---|---|---|
| | HDPE | | LDPE | | | | | | | | |
| Sample No. | Kind | Proportion (parts by weight) | Kind | Proportion (parts by weight) | (l/sec) | | Cooling roll stains | | | Curling properties | Cutta-bility |
| 14 | A | 75 | h | 25 | 3.1 | ○ | ○ | ○ | ○ | ○ | ○ |
| 15 | A | 80 | h | 20 | 4.4 | ○ | ○ | ○ | ○ | ○ | ○ |
| 16 | B | 65 | h | 35 | 1.7 | ○ | ○ | ○ | ○ | Δ | ○ |
| 17 | B | 70 | h | 30 | 2.8 | ○ | ○ | ○ | ○ | ○ | ○ |
| 18 | B | 75 | h | 25 | 3.7 | ○ | ○ | ○ | ○ | ○ | ○ |
| 19 | B | 80 | h | 20 | 6.3 | ○ | ○ | ○ | ○ | ○ | ○ |
| 20 | D | 80 | h | 20 | 6.7 | ○ | ○ | ○ | ○ | Δ | ○ |
| 21 | A | 80 | i | 20 | 7.0 | ○ | ○ | ○ | ○ | ○ | ○ |
| 22 | A | 80 | j | 20 | 8.0 | ○ | ○ | Δ | ○ | ○ | ○ |
| 23 | E | 80 | h | 20 | 7.3 | ○ | ○ | ○ | ○ | ○ | ○ |
| 24 | F | 80 | h | 20 | 8.2 | Δ | ○ | Δ | Δ | ○ | ○ |
| 25 | D | 80 | k | 20 | 17 | ○ | Δ | x | ○ | Δ | ○ |
| 26 | A | 80 | 1 | 20 | 17 | x | Δ | x | ○ | ○ | ○ |
| 27 | D | 80 | 1 | 20 | 20 | x | x | x | Δ | Δ | ○ |
| 28 | A | 80 | m | 20 | 20 | x | x | x | ○ | ○ | ○ |
| 29 | A | 80 | n | 20 | 9.0 | x | Δ | Δ | ○ | ○ | ○ |
| 30 | A | 80 | h | 20 | 7.5 | ○ | ○ | ○ | ○ | ○ | x |
| 31 | G | 80 | h | 20 | 10.4 | x | Δ | x | x | ○ | o |

From the results shown in Table 19, it can be well seen that the supports for image-forming material (samples No. 14 to No. 24) in which the polyethylene resin in the first resin layer is a compound resin composition prepared by previously melt-blending 90 parts by weight to 65 parts by weight of a high-density polyethylene resin having an MFR of 10 g/10 min to 40 g/10 min and a density of 0.960 g/cm$^3$ or more and 10 parts by weight to 35 parts by weight of a low-density polyethylene resin having an MFR of 0.2 g/10 min to 2 g/10 min and a density of 0.935 g/cm$^3$ or less, a percentage of molecules with a molecular weight of 500,000 or more of 10% by weight or more and a critical shear rate of 0.5 (l/sec) or less, and the critical shear rate of the composition is 10 (l/sec) or less, are excellent supports for image-forming material which are good in the molding processability of the polyethylene resin composition, are free from cooling roll stains, do not contain a gelatinous On the other hand, when the MFR of the low-density polyethylene resin is more than 2 g/10 min (sample No. 27), the molding processability and the degree of the formation of a gelatinous foreign matter are not satisfactory. Therefore, it is not desirable. When the percentage of molecules with a molecular weight of 500,000 or more is less than 10% by weight (samples No. 27 to No. 29), the molding processability is undesirably poor, and a large amount of a gelatinous foreign matter tends to be formed. When the MFR of the high-density polyethylene resin is more than 40 g/10 min (sample No. 31), the molding processability, the degree of the formation of a gelatinous foreign matter, and the adhesion between the base paper and the resin layer are not satisfactory. Therefore, it is not desirable. When the critical shear rate of the compound resin composition is more than 10 (l/sec) (samples No. 25 to No. 28 and No. 31), a large amount of a gelatinous foreign matter is disadvantageously formed, and a large number of cooling roll stains tend to be made.

The present invention makes it possible to provide an excellent resin-coated paper type support for image-forming material which hardly has cooling roll stains formed during the production and hence is free from problems caused by the transfer of the cooling roll stains; which does not contain a gelatinous foreign matter formed in the resin layer on the side reverse to the side on which an image-forming layer is to be formed; and which is good in the adhesion between the resin layer and base paper, is satisfactory in curling properties and cuttability, and can be produced rapidly and stably.

We claim:

1. A resin-coated paper comprising a paper substrate and a first resin layer formed on one side of the paper substrate, said first resin layer comprising a polyethylene resin composition obtained by melt-blending 90 parts by weight to 65 parts by weight of a high-density polyethylene resin having a melt flow rate prescribed in JIS K 6760 of 10.0 g/10 min to 40.0 g/10 min and a density of 0.960 g/cm$^3$ or more and 10 parts by weight to 35 parts by weight of a low-density polyethylene resin or a medium-density polyethylene resin, which has a melt flow rate prescribed in JIS K 6760 of 0.2 g/10 min to 2 g/10 min, a density of 0.935 g/cm$^3$ or less, a percentage of molecules with a molecular weight of 500,000 or more of 10% by weight or more and a critical shear rate of 0.5 (l/sec) or less, and said resin composition obtained by the melt-blending having a critical shear rate of 10 (l/sec) or less.

2. A resin-coated paper according to claim 1, wherein the melt flow rate of the low-density polyethylene resin or the medium-density polyethylene resin is 0.2 g/10 min to 1 g/10 min.

3. A resin-coated paper according to claim 1, wherein the center plane average roughness SRa in the lengthwise direction of the first resin layer is 0.6 to 2.0 $\mu$m as measured at a cut-off value of 0.8 mm by means of a feeler type three-dimensional surface roughness meter.

4. A resin-coated paper according to claim 1, wherein a second resin layer comprising a resin having film-forming properties is formed on the paper substrate on the side reverse to the side on which the first resin layer is formed.

5. A resin-coated paper according to claim 4, wherein the film thickness nonuniformity index Rpy in the paper-making direction of the paper substrate on the side on which the second resin layer is formed is 140 mV or less.

6. A resin-coated paper according to claim 4, wherein an image-forming layer is formed on the second resin layer.

7. A resin-coated paper according to claim 6, wherein the image-forming layer is a silver halide photographic layer.

8. A resin-coated paper according to claim 4, wherein the resin coating weight of the second resin layer is larger than that of the first resin layer by 3 g/cm$^2$ or more.

9. A resin-coated paper according to claim 4, wherein the second resin layer contains a titanium dioxide pigment.

10. A resin-coated paper according to claim 4, wherein the resin having film-forming properties is a polyolefin resin.

11. A resin-coated paper according to claim 10, wherein the polyolefin resin is a polyethylene resin.

12. A process for producing resin-coated paper which comprises:

melt-blending to obtain a polyethylene resin composition 90 parts by weight to 65 parts by weight of a high-density polyethylene resin having a melt flow rate prescribed in JIS K 6760 of 10.0 g/10 min to 40.0 g/10 min and a density of 0.960 g/cm$^3$ or more and 10 parts by weight to 35 parts by weight of a low-density polyethylene resin or a medium-density polyethylene resin, which has a melt flow rate prescribed in JIS K 6760 of 0.2 g/10 min to 2 g/10 min, a density of 0.935 g/cm$^3$ or less, a percentage of molecules with a molecular weight of 500,000 or more of 10% by weight or more, and a critical shear rate of 0.5 (l/sec) or less; and melt-extruding the resulting polyethylene resin composition to coat base paper therewith, said resin composition obtained by the melt-blending having a critical shear rate of 10 (l/sec) or less.

13. A process for producing resin-coated paper which comprises:

melt-blending to obtain a polyethylene resin composition 90 parts by weight to 65 parts by weight of a high-density polyethylene resin having a melt flow rate prescribed in JIS K 6760 of 10.0 g/10 min to 40.0 g/10 min and a density of 0.960 g/cm$^3$ or more and 10 parts by weight to 35 parts by weight of a low-density polyethylene resin or a medium-density polyethylene resin, which has a melt flow rate prescribed in JIS K 6760 of 0.2 g/10 min to 2 g/10 min, a density of 0.935 g/cm$^3$ or less, a percentage of molecules with a molecular weight of 500,000 or more of 10% by weight or more, and a critical shear rate of 0.5 (l/sec) or less; and melt-extruding the resulting polyethylene resin composition at a resin pressure at the end of the screw of an extruder which is higher than the critical resin pressure to coat base paper therewith, said resin composition obtained by the melt-blending having a critical shear rate of 10 (l/sec) or less.

14. A process for producing resin-coated paper which comprises:

melt-blending to obtain a polyethylene resin composition 90 parts by weight to 65 parts by weight of a high-density polyethylene resin having a melt flow rate prescribed in JIS K 6760 of 10.0 g/10 min to 40.0 g/10 min and a density of 0.960 g/cm$^3$ or more and 10 parts by weight to 35 parts by weight of a low-density polyethylene resin or a medium-density polyethylene resin, which has a melt flow rate prescribed in JIS K 6760 of 0.2 g/10 min to 2 g/10 min, a density of 0.935 g/cm$^3$ or less, a percentage of molecules with a molecular weight of 500,000 or more of 10% by weight or more, and a critical shear rate of 0.5 (l/sec) or less; and melt-extruding the resulting polyethylene resin composition at a revolution rate of the screw of an extruder which is higher than the critical revolution rate to coat base paper therewith, said resin composition obtained by the melt-blending having a critical shear rate of 10 (l/sec) or less.

15. A resin-coated paper comprising a paper substrate and a first resin layer formed on one side of the paper substrate, wherein the first resin layer has a melt flow rate prescribed in JIS K 6760 of 1.0–40 g/10 min, a density of 0.930–0.971 g/cm$^3$ and a critical shear rate of 10 (l/sec) or less.

16. A resin-coated paper according to claim 15, wherein the critical shear rate is 8 (l/sec) or less.

17. A resin-coated paper according to claim 15, wherein a second resin layer comprising a resin having film-forming properties is formed on the paper substrate on the side reverse to the side on which the first resin layer is formed.

18. A resin-coated paper according to claim 17, wherein an image-forming layer is formed on the second resin layer.

19. A resin-coated paper according to claim 18, wherein the image-forming layer is a silver halide photographic layer.

* * * * *